United States Patent
Kobayashi

(10) Patent No.: US 6,411,585 B1
(45) Date of Patent: Jun. 25, 2002

(54) METHOD FOR MANUFACTURING OPTICAL DISK, OPTICAL DISK APPARATUS, AND OPTICAL DISK WITH USING PHASE-SHIFTED SIGNAL FOR WOBBLING GROOVES

(75) Inventor: Shoei Kobayashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/079,416

(22) Filed: May 14, 1998

(30) Foreign Application Priority Data

May 19, 1997 (JP) .............................. 9-127725

(51) Int. Cl.$^7$ ................................ G11B 7/00
(52) U.S. Cl. .................. 369/112.01; 369/44.13; 369/53.21
(58) Field of Search .................. 369/50, 54, 58, 369/47, 48, 44.13, 275.3, 112.01, 53.21

(56) References Cited

U.S. PATENT DOCUMENTS

| | | | |
|---|---|---|---|
| 4,901,300 A | * | 2/1990 | Van Der Zande et al. .... 369/47 |
| 5,023,856 A | * | 6/1991 | Raaymakers et al. ......... 369/51 |
| 5,495,465 A | * | 2/1996 | Arisaka ........................ 369/50 |
| 5,508,985 A | * | 4/1996 | Fairchild et al. .............. 369/50 |
| 5,615,185 A | * | 3/1997 | Horikiri ....................... 369/47 |
| 5,617,392 A | * | 4/1997 | Shin ............................ 369/50 |
| 5,682,365 A | * | 10/1997 | Carasso et al. ............... 369/54 |
| 5,805,546 A | * | 9/1998 | Ando .......................... 369/54 |
| 5,844,883 A | * | 12/1998 | Kanno et al. ................. 369/54 |
| 5,930,210 A | * | 7/1999 | Timmermans et al. ... 369/44.13 |
| 5,946,279 A | * | 8/1999 | Okada et al. ................. 369/47 |
| 5,949,746 A | * | 9/1999 | Yamagami et al. ........... 369/48 |
| 5,963,519 A | * | 10/1999 | Kim ............................ 369/50 |
| 5,978,333 A | * | 11/1999 | Kobayashi et al. ...... 369/44.13 |
| 5,991,258 A | * | 11/1999 | Morita et al. ............ 369/275.4 |
| 5,999,504 A | * | 12/1999 | Aoki ....................... 369/44.13 |
| 6,005,834 A | * | 12/1999 | Maeda et al. ............ 369/44.23 |
| 6,009,072 A | * | 12/1999 | Tsuchiya et al. ......... 369/275.4 |
| 6,028,828 A | * | 2/2000 | Maeda .................... 369/44.13 |
| 6,069,870 A | * | 5/2000 | Maeda et al. ............ 369/275.5 |

* cited by examiner

Primary Examiner—Nabil Hindi
(74) Attorney, Agent, or Firm—Frommer Lawrence & Haug LLP; William S. Frommer; Bruno Polito

(57) ABSTRACT

In an optical disk, serial data representative of positional information is preformatted by using a groove, and this groove is wobbled. When this preformatted optical disk is applied to an optical disk apparatus, a laser beam irradiation position can be controlled in high precision. A method for manufacturing this preformatted optical disk is disclosed.

22 Claims, 16 Drawing Sheets

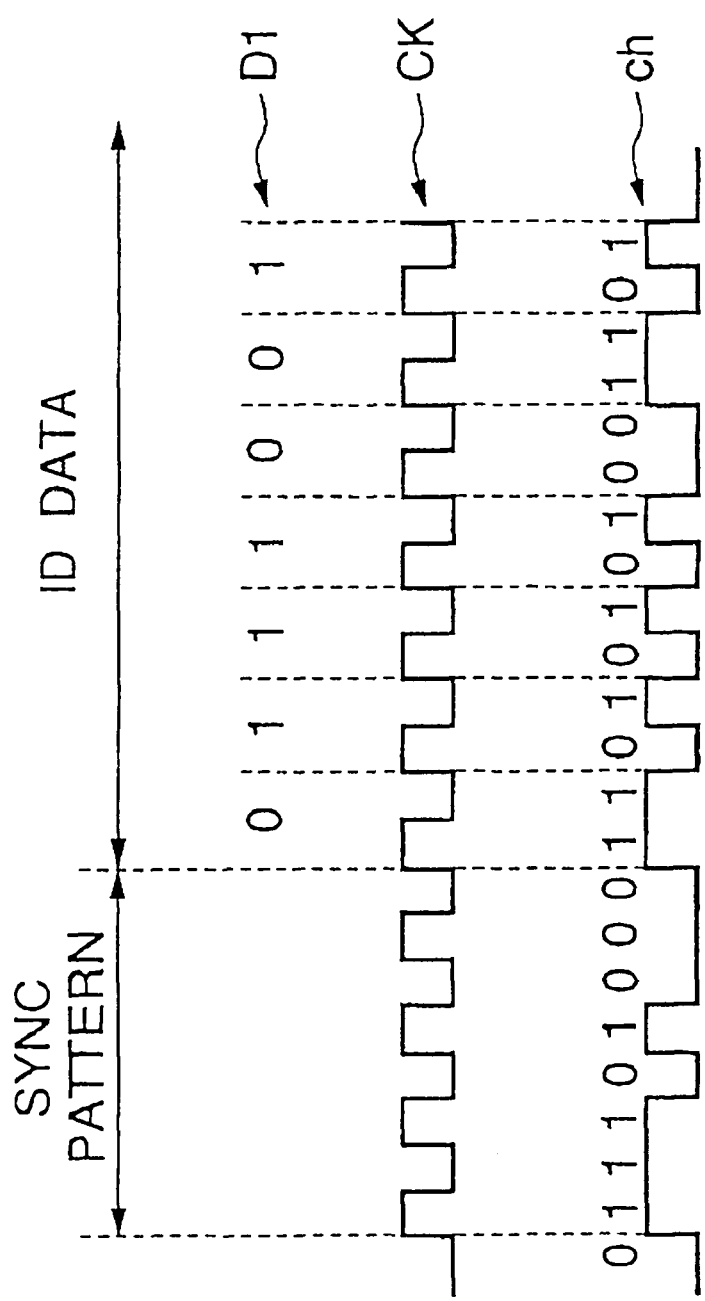

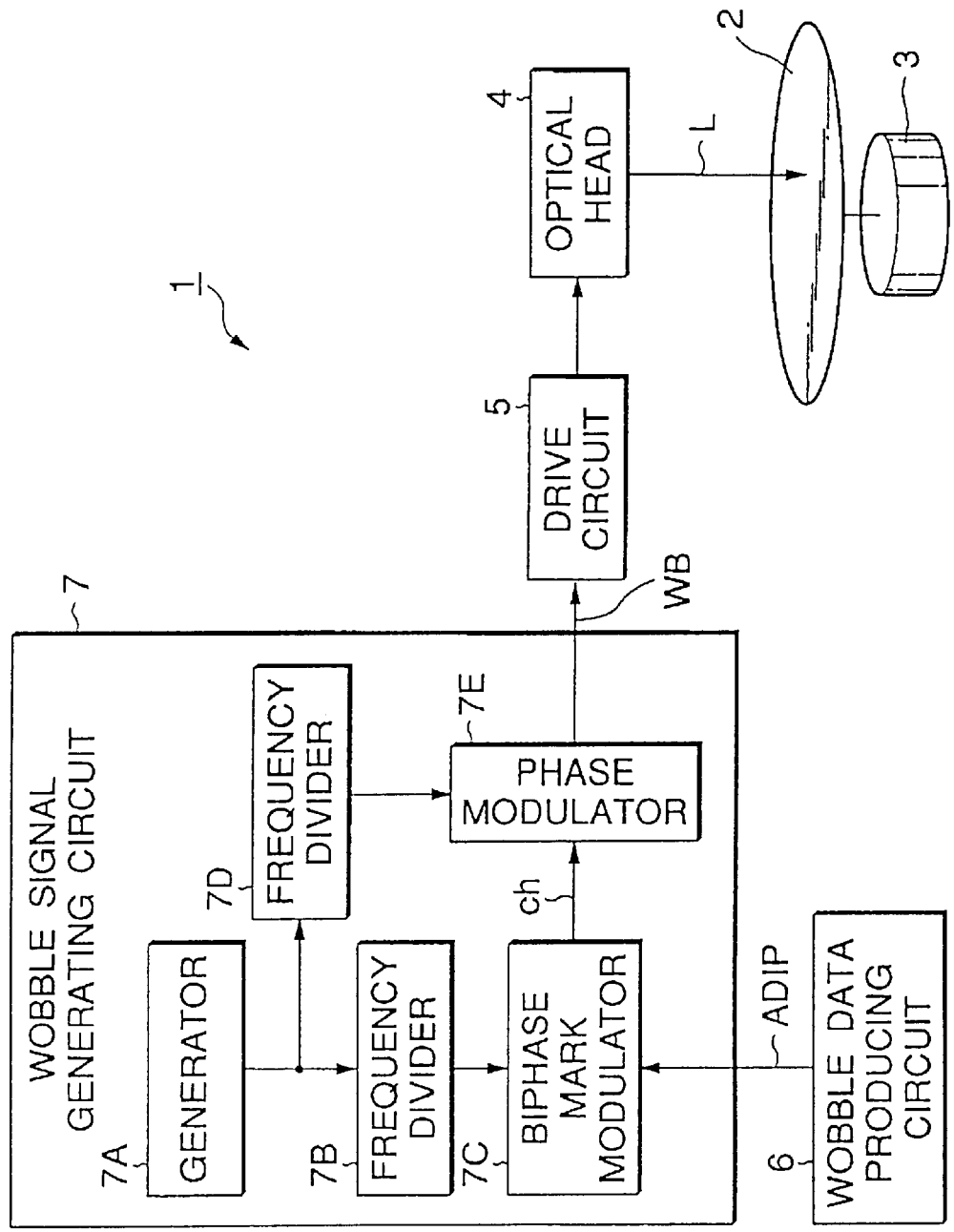

FIG.5A
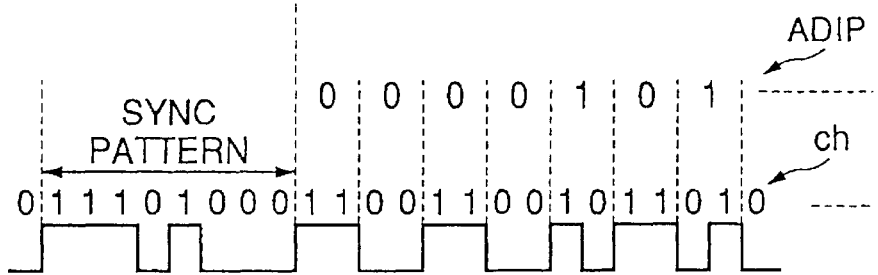
FIG.5B
FIG.5C
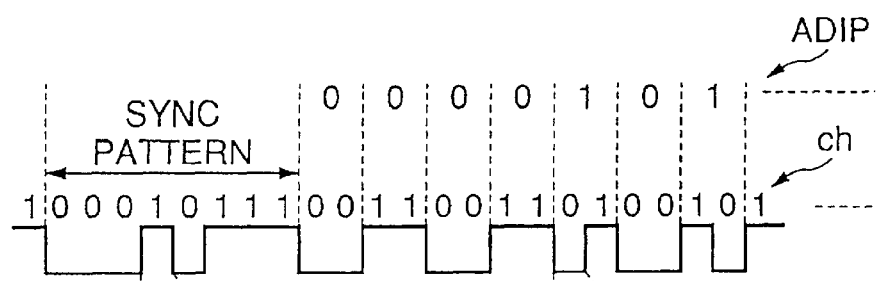
FIG.5D
FIG.5E
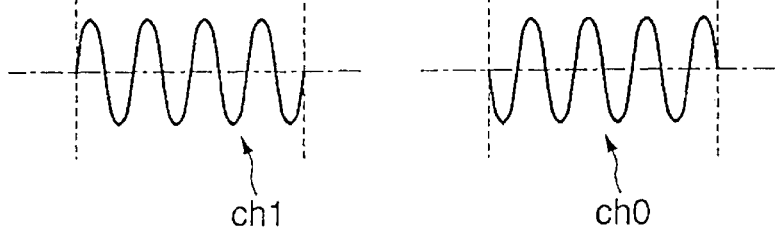
FIG.5F

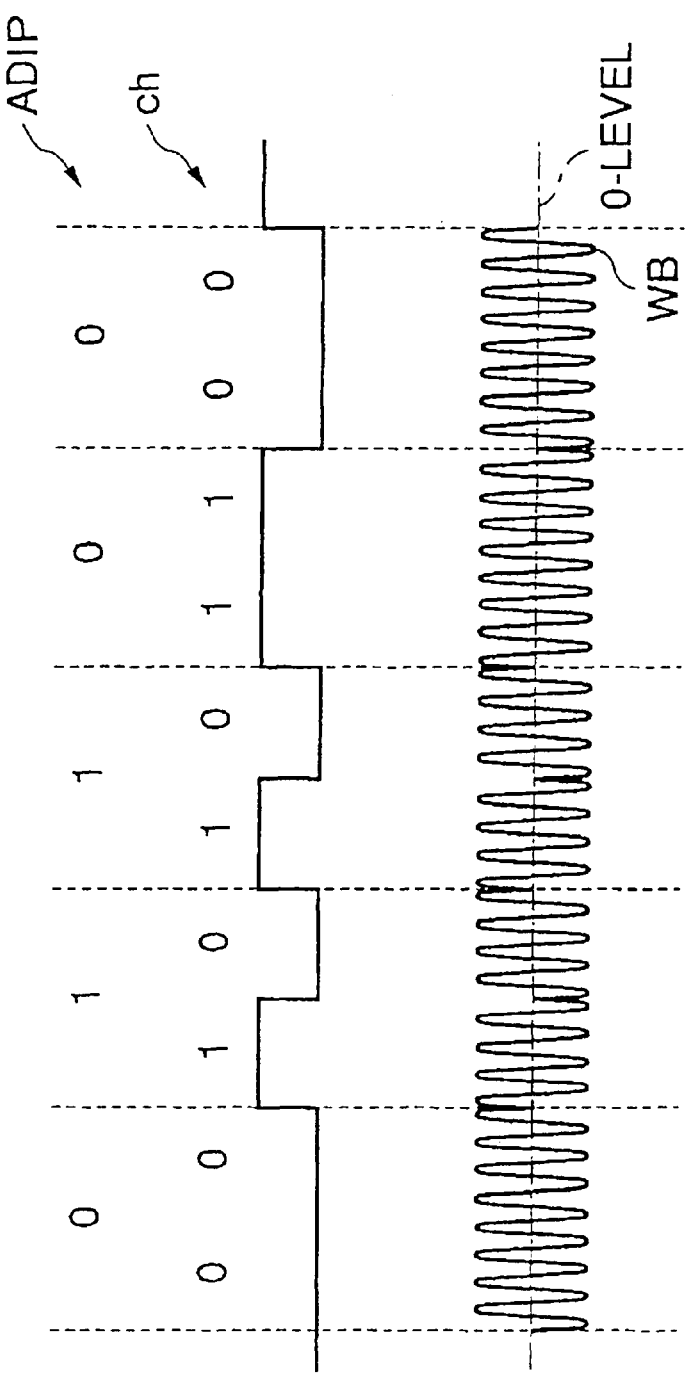

METHOD FOR MANUFACTURING OPTICAL DISK, OPTICAL DISK APPARATUS, AND OPTICAL DISK WITH USING PHASE-SHIFTED SIGNAL FOR WOBBLING GROOVES

BACKGROUND OF THE INVENTION

The present invention generally relates to a method for manufacturing an optical disk, an optical disk apparatus, and an optical disk. More specifically, the present invention is directed to an optical disk in which serial data such as positional information is recorded by, for example, wobbling grooves functioning as guide grooves for a laser beam, and an optical disk apparatus for accessing this optical disk. In particular, the present invention is related to a technique capable of specifying a laser beam irradiation position in high precision while grooves are wobbled in response to a phase-shifted signal.

Conventionally, in optical disks, since grooves functioning as guide grooves for guiding a laser beam are wobbled, positional information and time information of laser beam irradiation positions (will be referred to as "wobble data" hereinafter) are detected (see U.S. Reissue Patent 34,719).

That is, in a manufacturing step for this sort of optical disk, while a mother disk is rotated at a preselected rotation speed, a laser beam is irradiated onto this mother disk, and this laser beam irradiation position is sequentially shifted toward an out peripheral side of the mother disk. As a result of this optical disk manufacturing step, the mother disk is sequentially exposed by the laser beam to form a track in a helical form from an inner peripheral side of this mother disk to the outer peripheral side thereof.

In the optical disk manufacturing step, a stamper is formed from this mother disk through a developing step and an electrocasting (electroforming) process step, and then an optical disk is formed by this stamper. As a consequence, in this optical disk, the groove is formed in the helical shape from the inner peripheral side of this optical disk to the outer peripheral side thereof in correspondence with the laser beam irradiation position on the mother disk.

When the mother disk is exposed in the above-described manner, as indicated in FIG. 1, in the manufacturing step for the optical disk, a reference signal which is synchronized with a predetermined carrier signal is frequency-divided to thereby produce a clock (see FIG. 1B). Furthermore, both a first reference signal which is synchronized with this clock CK, and a second reference signal constituted by a ½-frequency-divided signal of the clock CK are arranged in response to a logic level of wobble data D1 (see FIG. 1A), respectively. As a result, the wobble data D1 is biphase-mark-modulated (see FIG. 1A, FIG. 1B, and FIG. 1C). In addition, a sync pattern is inserted into a serial data stream produced by biphase-mark-modulating such wobble data D1 to thereby produce a channel signal "ch". Thereafter, the carrier signal which is used to generate the clock CK is frequency-modulated by this channel signal "ch", so that a frequency-modulated signal (will be referred to as a "wobble signal" hereinafter) WB is produced. In the manufacturing step of the optical disk, an irradiation position of a laser beam is shifted, or deviated along the radial direction of the mother disk in order to follow a signal level of this wobble signal WB.

As a result, as shown in FIG. 2, in this sort of optical disk, a groove is formed in such a manner that this groove is wobbled in response to a sync pattern and ID data. A spindle motor is controlled in such a manner that a center frequency of this wobble becomes a predetermined frequency, so that this optical disk is rotated at a preselected rotation speed. While using this wobble as a reference, the ID data is detected in order that the recording/reproducing position can be confirmed. Also, various sorts of processing reference clocks can be produced on the basis of this wobble (see FIG. 2A to FIG. 2C).

In accordance with this wobbled groove, the information recording plane can be effectively utilized, as compared with such an optical disk case that address data and the like are recorded by using a prepit. Moreover, the timing control can be easily performed during the recording operation. In addition, this preformatted groove type optical disk owns such a feature that compatibility can be readily established with a reproduction-only optical disk in which data is recorded by using a pit.

Moreover, in the conventional ID data recording method by the groove, the positional information can be detected in sufficient precision along the radial direction of the optical disk, whereas there is such a problem that the positional information could not detected in high precision along the rotation angle direction of the optical disk. Accordingly, if this problem can be solved, then the desirable data may be recorded in further high density in the conventional recording method.

OBJECT & SUMMARY OF THE INVENTION

The present invention has been made to solve the above-described problem, and therefore has an object to provide a method for manufacturing an optical disk, an optical disk, and also an optical disk apparatus, capable of specifying a laser beam irradiation position while desirable data is recorded by using a wobbled groove.

In an optical disk and an optical disk manufacturing method, according to the present invention, a phase-modulated signal is produced, and then a groove of the optical disk is wobbled in response to a signal level of this phase-modulated signal.

In this phase-modulated signal, time periods of the wobbled grooves can be kept constant. Also, in a wobble signal produced by detecting this wobbled groove, a single frequency is maintained. As a result, a clock having high precision can be generated based upon the frequency information of this wobble signal. Thus, angular information can be detected in high precision as to a laser beam irradiation position by using this clock having such high precision.

BRIEF DESCRIPTION OF THE DRAWINGS

The above-described object, other features, and advantages of the present invention will become apparent from the following descriptions to be read in conjunction with the accompanying drawings, in which:

FIG. 1 shows a signal waveform chart for describing the biphase mark modulation;

FIG. 3 schematically illustrates a block diagram of a mastering apparatus according to an embodiment of the present invention;

FIG. 5 illustratively shows a signal waveform diagram for explaining a wobble signal generation by the mastering apparatus of FIG. 3;

FIG. 6 is a signal waveform diagram for indicating the wobble signal produced from the mastering apparatus shown in FIG. 3;

DESCRIPTION OF THE PREFERRED EMBODIMENTS

Figures 2A, 2B, 2C:
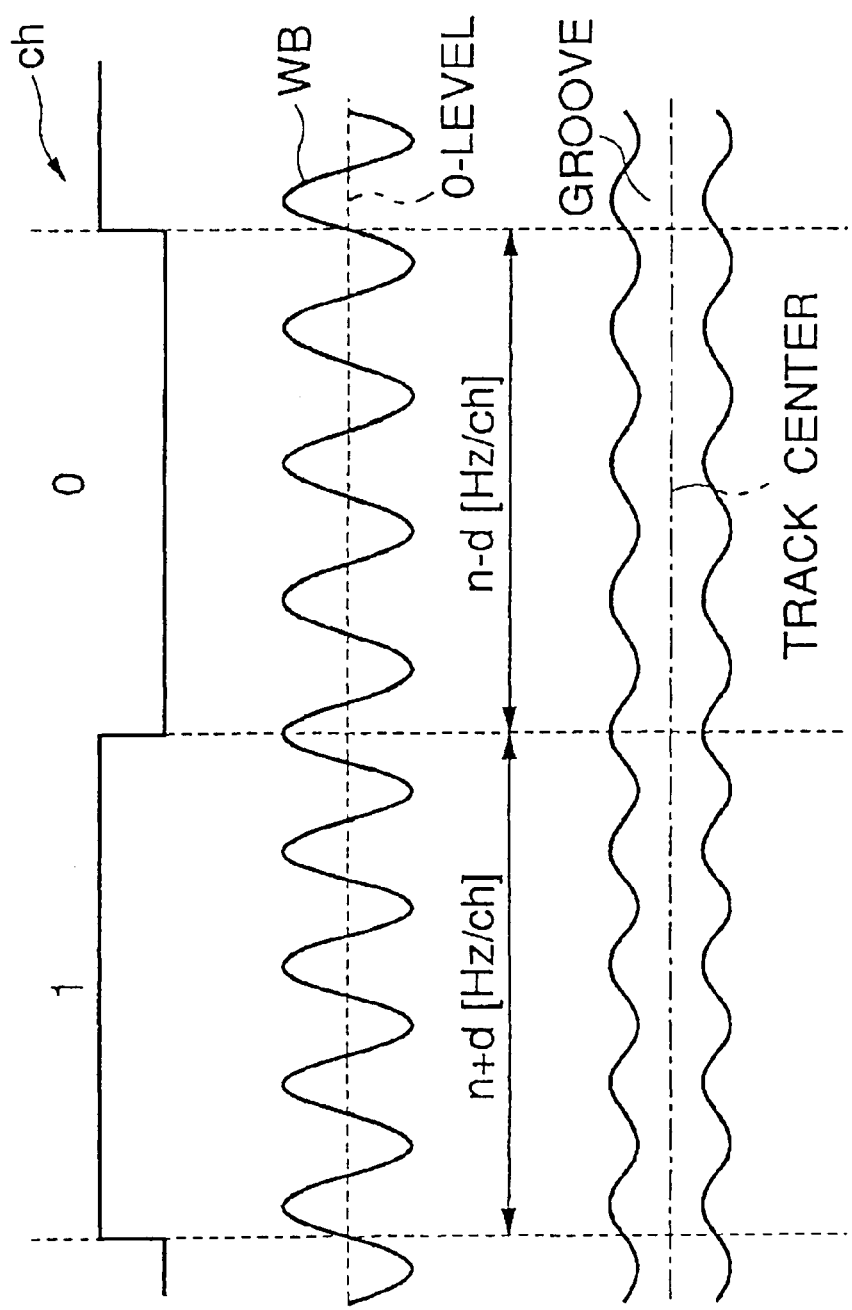
FIG. 2 represents a characteristic curve for explaining the production of grooves.

Referring now to drawings, various preferred embodiments of the present invention will be described in detail.

FIG. 3 is a schematic block diagram for indicating a mastering apparatus according to an embodiment of the present invention. In a manufacturing step of an optical disk according to this embodiment, a mother disk 2 is exposed by this mastering apparatus 1, and an optical disk is manufactured by this mother disk 2.

In this mastering apparatus 1, the mother disk 2 is formed by, for instance, coating resist on a surface of a glass base plate, and this glass base plate coated with the resist is rotated by a spindle motor 3 under a constant angular velocity.

An optical head 4 irradiates a laser beam "L" onto the mother disk 2, while this optical head 4 is sequentially shifted from an inner peripheral side of this mother disk 2 to an outer peripheral side thereof by way of a predetermined thread mechanism in synchronism with the rotation of this mother disk 2. As a result, the optical head 4 produces a track in a helical form in the mother disk 2 from the inner peripheral side thereof to the outer peripheral side. At this time, the optical head 4 is controlled by the thread mechanism in such a manner that this optical head 4 is deviated only by approximately 1.0 [μm] within a time period during which the mother disk 2 is rotated by 1 turn. As a result, a truck pitch formed by the grooves may be formed as approximately 1.0 [μm], and also, in the case that a track is formed in a land between grooves (namely, so-called "land groove recording" system), the-track may be formed by a track pitch of 0.5 [μm]. It should be noted that the track pitch formed in the land groove recording system is 1.48 times larger than the track pitch (0.74 [μm]) introduced in DVD (Digital Versatile Disc).

As a consequence, in this mastering apparatus 1, desirable data is recorded in a line recording density of approximately 0.21 [μm/bit] on an optical disk formed by this mother disk 2, and then more than 8 G bytes (capacity) of data may be recorded on this optical disk based on the following formula (1):

$$4.7 \times \frac{0.74 \times 0.267}{0.5 \times 0.21} \geq 8. \tag{1}$$

where numeral 4.7 shows a recording capacity [GB] of DVD, and numerals 0.74 and 0.267 represent the track pitch [μm] of DVD, and the line recording density [μm/bit]. As a result, the formula (1) indicates the recording capacity by the same data process as that of DVD.

Furthermore, at this time, a spot diameter of a laser beam L emitted from the optical head 4 is set in such a manner that when an optical disk is formed from this mother disk 2, intervals between a groove formed by exposing this laser beam L and the adjoining grooves are substantially equal to each other. It should be noted that in this case, the spot shape and the light amount of the laser beam are set in order that the effective exposure range by the laser beam is increased by approximately 120% with respect to a final target width of a groove.

In addition, the optical head 4 is arranged in such a manner that an optical system is movable along a radial direction of the mother disk 2. A drive circuit 5 drives the optical system of the optical head 4 in response to a wobble signal WB. As a result, in the mastering apparatus 1, the irradiation position of the laser beam L is wobbled in response to the wobble signal WB.

A wobble data producing circuit 6 produces wobble data ADIP whose value is sequentially varied in response to the shifts (deviation) of the optical head 4, and outputs this wobble data ADIP. That is, the wobble data producing circuit 6 receives a timing signal (constructed of an FG signal and the like) synchronized with the rotation of the mother disk 2 from the spindle motor 3, and this timing signal is counted by a predetermined counter. As a result, the wobble data producing circuit 6 produces a frame number "Frame", and a track number "Track". The value of this frame number "Frame" is sequentially and cyclically varied in a time period during which the mother disk 2 is rotated by, for example, 1/16. The value of the track number "Track" is varied every time the irradiation position of the laser beam L is shifted by 1 track in response to the change of the frame number "Frame".

As a result, the wobble data producing circuit 6 produces address data constructed of the frame number "Frame" and the track number "Track". It should also be noted that the wobble data producing circuit 6 produces, for instance, a 4-bit frame number "Frame", and a 20-bit track number "Track".

Moreover, the wobble data producing circuit 6 executes a preselected calculation process operation by employing an information word M(x) made of this frame number "Frame" and this track number "Track", and then produces an error detection code CRC (Cyclic Redundancy Check Code).

Figure 4:
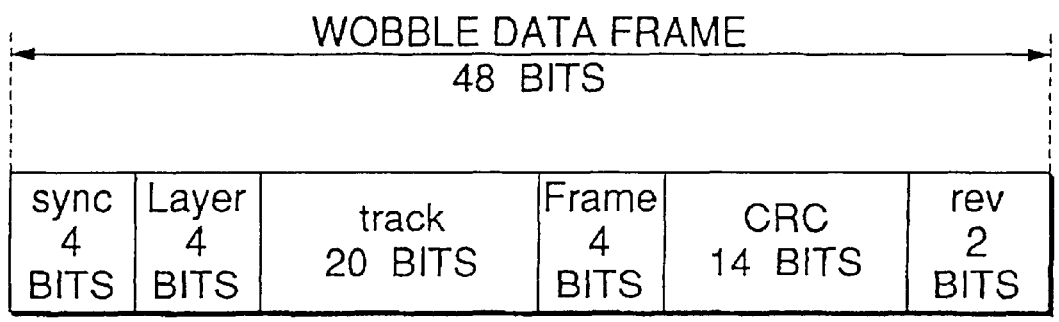
FIG. 4 schematically shows a structure of a wobble data frame produced by the mastering apparatus indicated in FIG. 3.

In addition, the wobble data producing circuit 6 sequentially produces a wobble data frame having a format shown in FIG. 4 by adding a reserve bit "rev" to these frame number "Frame", track number "Track", and error detection code CRC. In this embodiment, the wobble data producing circuit 6 forms each of the wobble data frames by 48 bits, and sets a predetermined sync bit "Sync" to 4 bits of the 48 bit wobble data frame from a head bit thereof, to which fixed data set by a system control circuit (not shown) is allocated. Data of a recording layer is allocated to subsequent 4 bits of the 48-bit wobble data frame. At this stage, the optical disk formed from the mother disk 2 owns a plurality of information recording layers, and the information recording layers can be specified by the data of the information recording layers.

Furthermore, the wobble data producing circuit 6 sequentially arranges the track number Track, the frame number Frame, and the error detection code CRC, and further arranges the reserve bit "rev" at a 2-bit trail portion.

As previously explained, the wobble data producing circuit 6 sequentially produces the wobble data frame is synchronism with the rotation of the mother disk 2, and converts this produced wobble data frame into serial data in synchronism with the rotation of the mother disk 2, and also sequentially outputs this serial data as wobble data "ADIP" to a wobble signal generating circuit 7.

The wobble signal generating circuit 7 generates a wobble signal WB based upon the wobble data ADIP. In this wobble signal generating circuit 7, a generating circuit 7A generates a reference signal having a frequency of 115.2 [KHz]. It should also be noted that in this mastering apparatus 1, the spindle motor 3 is spindle-controlled by using this reference signal, so that the wobble signal WB may be produced in synchronism with the rotation of the mother disk 2. A frequency dividing circuit 7B frequency-divides this reference signal having the frequency of 115.2 [KHz] by ⅛ to produce a reference clock having a frequency of 14.4 [KHz].

As indicated in FIG. 5, a biphase mark modulating circuit 7C sequentially selects a first reference clock and a second reference clock in response to a logic level of the wobble data ADIP. The first reference clock is synchronized with the phase of this reference clock having the frequency of 14.4 [KHz]. The second reference clock has such a frequency which is set to be a ½ frequency of this first reference clock. As a result, the biphase mark modulating circuit 7C executes the biphase mark modulation for the wobble data ADIP to produce a channel signal "ch".

At this time, the biphase mark modulating circuit 7C allocates a predetermined sync pattern to a head of each of the wobble data frames so as to produce the channel signal "ch" (see FIG. 5A to FIG. 5E). It should be understood that this sync pattern is such a unique pattern which is not produced by the biphase mark modulation, a pattern whose DSV is equal to 0 is allocated to this sync pattern, and a polarity of this sync pattern is set in order that the signal level of the channel signal "ch" is switched at a boundary between the sync pattern and the wobble data frame. Also the signal level of the channel signal "ch" is inverted at such timing corresponding to the bit boundary of the wobble data ADIP, and when the logic level of the wobble data ADIP is equal to 0, the second reference clock is allocated to the channel "ch" and the signal level thereof is maintained at a constant logic level. Also, when the logic level of the wobble data ADIp is equal to 0, the first reference clock is allocated to this signal channel "ch", and the signal level thereof is inverted at timing corresponding to the bit center.

The frequency dividing circuit 7D frequency-divides the frequency of 115.2 [KHz] of the reference signal by ½ to thereby produce a phase modulating reference signal having a frequency of 57.6 [KHz] which is set to be 4 times higher than a frequency of a phase modulating clock.

In response to this phase modulating reference clock having the frequency of 57.6 [KHz], a phase modulating circuit 7E produces a first carrier signal and a second carrier signal. The phase of the first carrier signal is synchronized with the phase of this reference clock. The phase of the second carrier signal is shifted by 180 degrees from the phase of this reference clock. In response to the signal level of the channel signal "ch", this phase modulating circuit 7E selectively outputs these first and second carrier signals (see FIG. 5F). As a result, the phase modulating circuit 7E modulates the channel signal "ch" and then outputs this modulated channel signal as the wobble signal WB.

As a consequence, as shown in FIG. 6, after the wobble signal generating circuit 7 biphase-mark-modulates the wobble data ADIP (see FIG. 6A and FIG. 6B), the wobble signal generating circuit 7 inserts the sync pattern into the biphase-mark-modulated data to thereby produce a phase modulation signal having a single carrier frequency. Then, this phase modulation signal is outputted as the wobble signal WB (see FIG. 4C).

In accordance with this embodiment, after the shape of the groove corresponding to the laser beam irradiation position has been formed on the surface of the other disk 2 by developing this mother disk 2, this mother disk 2 is electrocasting (electroforming)-processed so as to form a stamper. Furthermore, a disk board is formed by this stamper, and then optical disks are manufactured by using this disk board.

Figure 7:
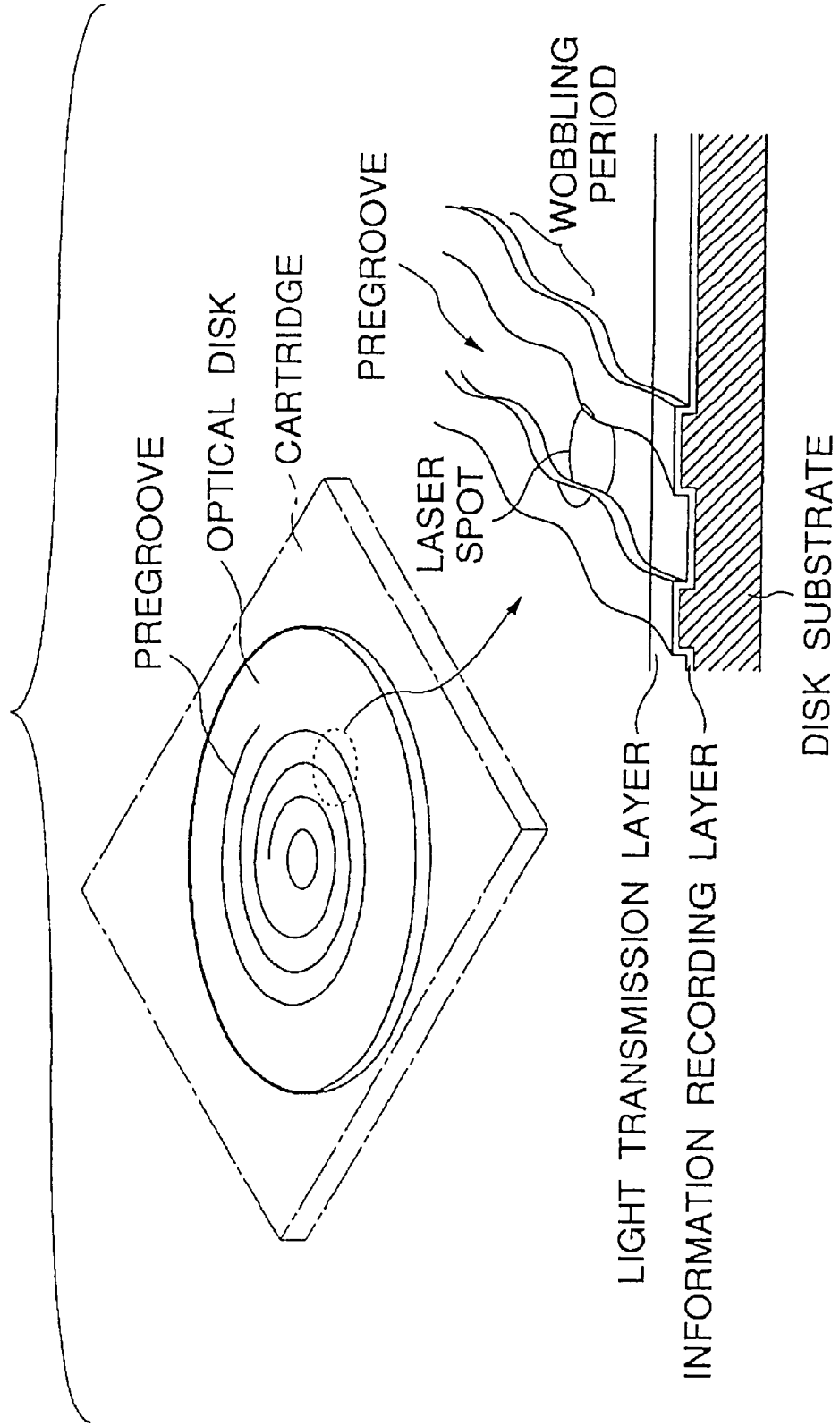
FIG. 7 is a perspective view for showing an optical disk manufactured by using the mastering apparatus of FIG. 3.

FIG. 7 is a perspective view for indicating an optical disk formed from this mother disk 2.

This optical disk is formed of a plate having a thickness of 1.2 [mm]. In a phase change type optical disk, an aluminum film, an ZnS—SiO$_2$ film, a GeSbTe film, and another ZnS—SiO$_2$ film are successively formed on a disk board to thereby form an information recording layer. In a magneto-optical disk, an aluminum film, an SiN film, a TbFeCo film, and another SiN film are successively formed on a disk board to thereby form an information recording layer. In a write once optical disk, a sputtered film made of aluminum, or gold, and a preselected organic dye film are successively formed on a disk board to thereby form an information recording layer.

Furthermore, a light transmission layer having a thickness of approximately 0.1 [mm] is formed on this information recording layer. This light transmission layer conducts a laser beam which has passed through this light transmission layer into an information recording plane. As a result, in accordance with the optical disk of this embodiment, even when the laser beam is irradiated via the light transmission layer from an optical system having a large numerical aperture (NA), the adverse influence caused by skew can be effectively avoided, so that desirable data can be firmly recorded/reproduced on this information recording plane.

It should be understood that this optical disk is formed having a diameter of 120 [mm], and a region defined by a radius of 24 [mm] to 58 [mm] is allocated to a recording region.

In addition, the optical disk is stored into a predetermined cartridge formed capable of discriminating a sort of an optical disk stored therein. The optical disks may be mounted on the optical disk apparatus with respect to these cartridges. As a result, even when these mounted optical disks are accessed via the optical system having the large numerical aperture, the adverse influences caused by dust and the like can be effectively avoided.

Accordingly, in the phase change type optical disk, the crystal structure of the information recording plane is locally changed by irradiating the laser beam thereon, so that the desirable data can be recorded. Also, the data recorded on the information recording plane of this phase change type optical disk can be reproduced by detecting the light amount change in the returned laser light.

Also, in the magneto-optical disk, the magnetic field is applied to the laser beam irradiated position, so that the desirable data can be thermally and magnetically recorded thereon. Furthermore, the recorded data can be reproduced by using the Kerr effect by detecting the polarized plane of the returned laser light. Moreover, in the write once optical disk, the information recording plane is locally destroyed by irradiating the laser beam, so that the desirable data can be recorded. Also, the light amount change in the returned laser light is detected, so that the recorded data can be reproduced.

In these cases, in the optical disks, the mother disk 2 is rotated under a constant angular velocity condition, and the grooves are formed by the phase-modulated wobble signal, so that the wobbling periods of the grooves which are converted into the rotation angles of the optical disk is made constant. In this case, it should be noted that this groove is formed in such a manner that the wobbling is defined by the amplitudes of 15 [nm] to 30 [nm], and the depth is formed by a 1/6 to a 1/5 wavelength with respect to a laser beam having a wavelength of 650 [nm].

Figure 8:
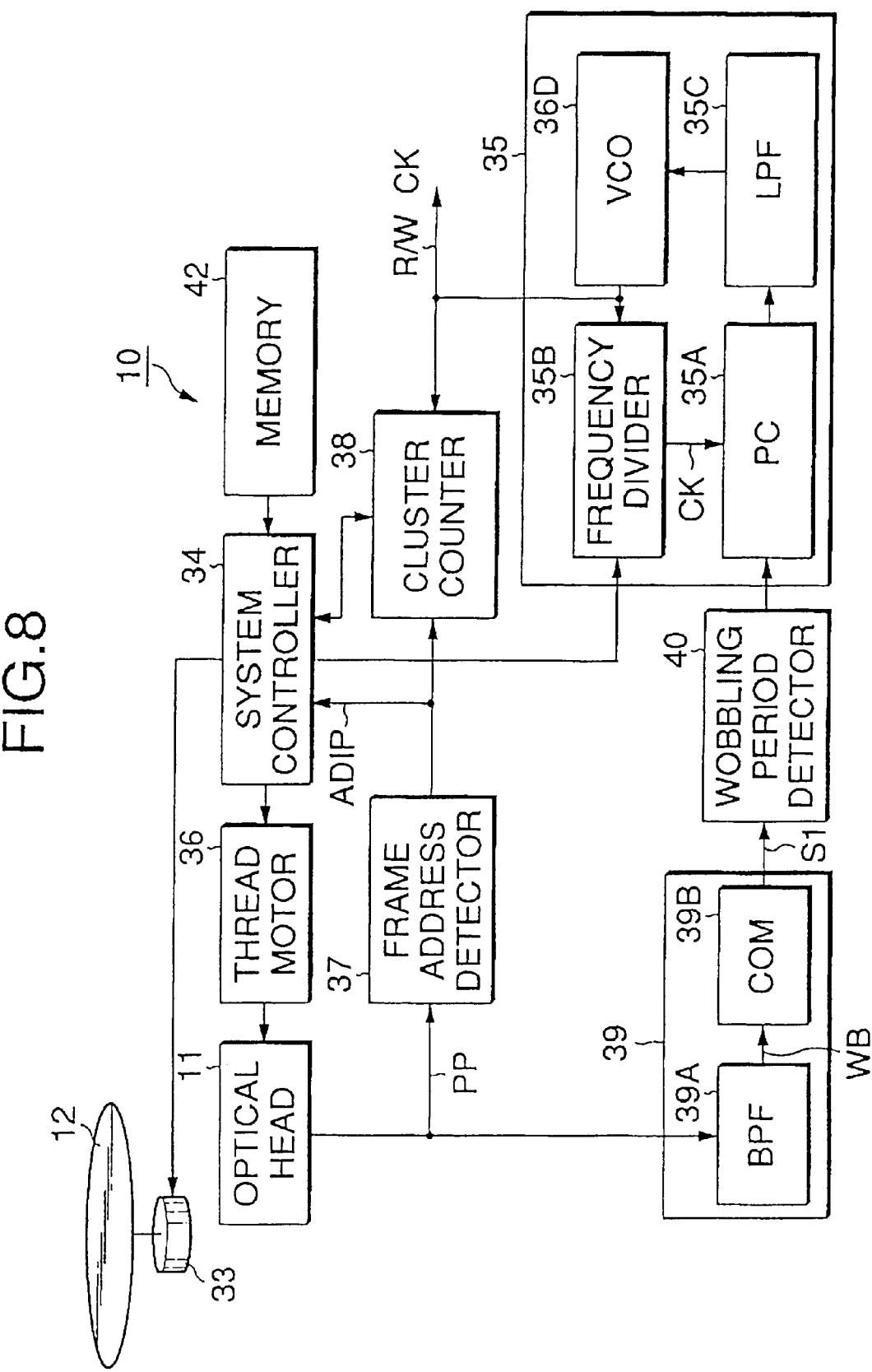
FIG. 8 is a schematic block diagram for indicating a wobble signal processing system employed in an optical disk apparatus capable of accessing the optical disk manufactured by using the mastering apparatus of FIG. 3.

FIG. 8 is a schematic block diagram for schematically indicating an optical disk apparatus for recording and/or reproducing information on/from the optical disk manufactured in the above-described manner, mainly showing a wobble signal processing system thereof. In this optical disk apparatus 10, a laser beam is irradiated from an optical head 11 onto an optical disk 12, and a laser beam reflected from this optical disk 12 is received by the optical head 11.

Figure 9:
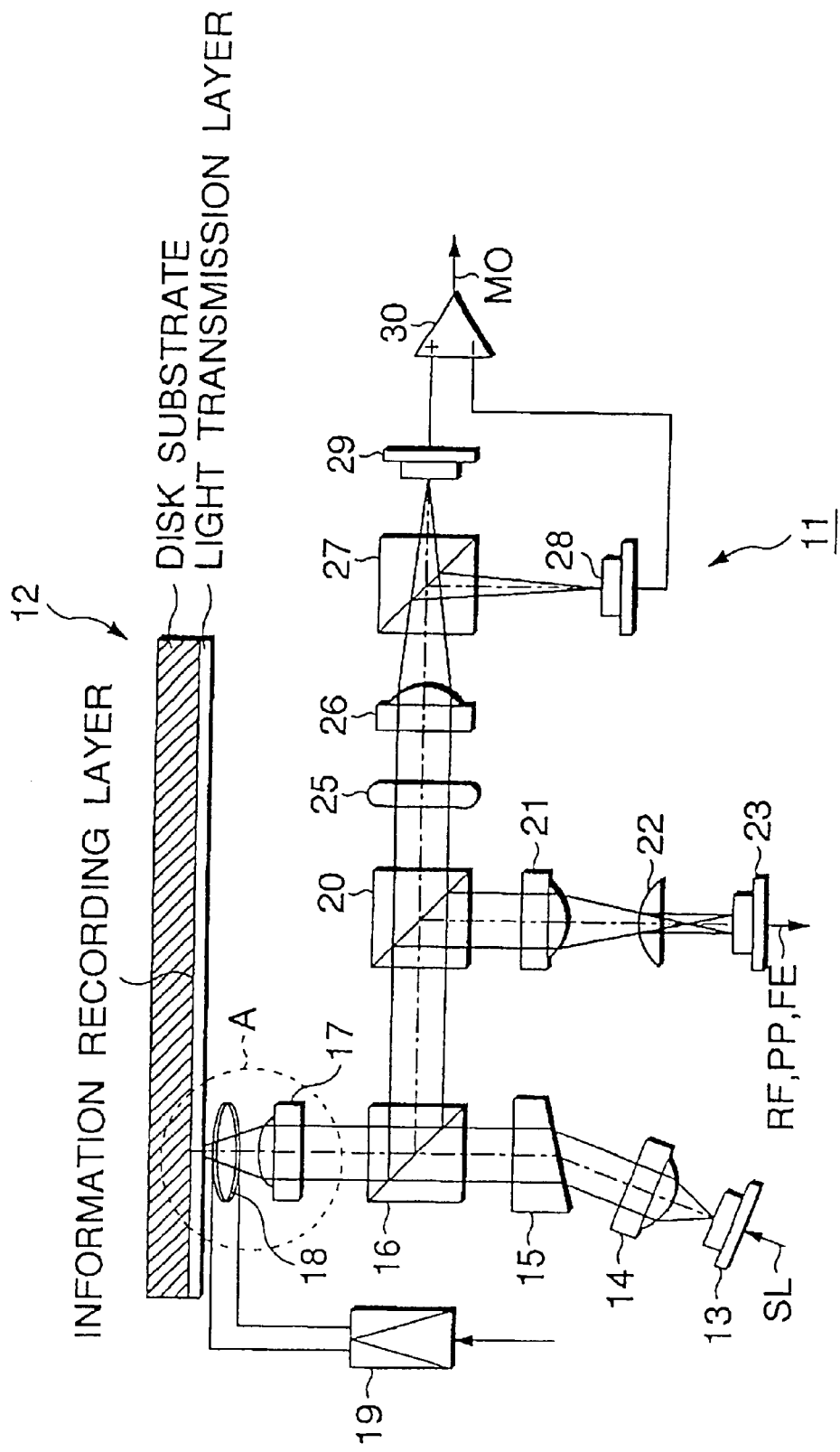
FIG. 9 schematically illustrates an optical head employed in the optical disk apparatus of FIG. 8.

That is, as indicated in FIG. 9, in the optical head 11, a semiconductor laser 13 is driven in response to a predetermined drive signal to thereby emit a laser beam having a wavelength of 650 [nm]. At this time, the semiconductor laser 13 emits a constant light amount of the laser beam during the reproducing operation. To the contrary, a light amount of a laser beam is increased to be emitted from the semiconductor laser 13 during the recording operation. In this embodiment, since the light amount of this laser beam is increased, either a pit or a mark may be formed in an information recording layer of the optical disk 12.

A collimator lens 14 provided subsequent to the semiconductor laser 13 converts the laser beam projected from this semiconductor laser into parallel light. A shaping lens 15 provided subsequent to this collimator lens 14 corrects astigmatism of this laser beam, and then causes the corrected laser beam to pass through a beam splitter 16, and thereafter enters the resulting laser beam into an objective lens 17.

The objective lens 17 condenses this laser beam onto an information recording plane of the optical head 12, and then receives a laser beam reflected from this information recording plane. As a result, in the optical disk apparatus 10, in such a case that the optical disk 12 corresponds to a reproduction-only optical disk, the data recorded on the optical disk 12 can be reproduced in response to a change in the light amounts of this return light. Also, when the optical disk 12 corresponds to a phase change type optical disk, a crystal structure of a laser beam irradiation position is locally changed so as to record desirable data, and the recorded data may be reproduced in response to a change in light amounts of a returned laser beam.

Furthermore, when the optical disk 12 corresponds to a write once type optical disk, a laser beam irradiation position is locally deformed so as to record desirable data, whereas the recorded data can be reproduced in response to a change in light amounts of a returned laser light. In contrast thereto, when the optical disk 12 corresponds to a magneto-optical disk, a modulation coil 18 arranged in the vicinity of the objective lens 17 is driven by a preselected drive circuit 19 so as to apply a predetermined modulated magnetic field to a laser beam irradiation position, so that the thermal magnetic recording method is applied to record desirable data, whereas the recorded data can be reproduced by detecting a change in polarized planes of a returned laser light.

As a consequence, the beam splitter 16 causes the laser beam entered from the shaping lens 15 to pass through this beam splitter 16, and then projects this laser beam onto the objective lens 17, whereas the beam splitter 16 reflects the return light which is entered from the objective lens 17 to thereby separate the optical path, and thereafter projects the separated laser beam to another beam splitter 20.

The beam splitter 20 may cause this returned laser light to pass therethrough and then be reflected, so that this return light is separated into two sets of light which will be projected therefrom.

A lens 21 enters therein the returned laser light which has been reflected by the beam splitter 20, and converts this returned laser light into a converged luminous flux. A cylindrical lens 22 applies astigmatism to the return light projected from the lens 21. A photodetector 23 receives return light which is projected from this cylindrical lens 22.

In this case, the photodetector 23 is designed in such a manner that a light receiving plane thereof is subdivided into preselected shapes, and light received results of the subdivided light receiving planes can be outputted. As a consequence, the photodetector 23 may detect a reproduction signal RF, a push-pull signal PP, and a focus error signal FE in such a manner that after the light received results of the respective light receiving planes are converted in a current/voltage converting manner by a current/voltage converting circuit (not shown), the resulting voltages are added/subtracted by a matrix circuit. The reproduction signal RF changes its signal level in response to the light amount of the return light. The signal level of the push-pull signal PP is changed in response to deviation (shifts) of the laser beam irradiation position with respect to the groove, or the pit stream. The signal level of the focus error signal FE is changed in response to the defocus amount.

To the contrary, a ½ wavelength plate 25 enters thereinto the return laser light which has passed through the beam splitter 20, changes the polarization plane of this return light, and then projects this return light having the changed polarization plane from a polarization plane of a polarization beam splitter 27 (will be discussed later), which is suitable for separating return light. A lens 26 converts the return light projected from the ½ wavelength plate 25 into a converged luminous flux. The polarization beam splitter 27 receives this return light, and then reflects a predetermined polarization component and also transmits the remaining polarization component therethrough. As a result, this beam splitter 27 splits the return light. into two sets of luminous fluxes whose light amounts are complementarily changed in accordance with the polarization planes.

The photodetectors 28 and 29 receive two sets of luminous fluxes splitted by this polarization beam splitter 27, respectively, and thereafter output light reception signals whose levels are changed in response to the received light amounts. A differential amplifier 30 accepts the light signals derived from these two photodetectors 28 and 29 via a current/voltage converting circuit to differentially amplify these light signals. Then, this differential amplifier 30 outputs a reproduction signal MO whose signal level is varied in response to the polarization plane of the return light based on this differentially amplified result.

With employment of these components, the optical head 11 can record the desirable data, and also can reproduce the recorded data with respect to various sorts of optical disks 12.

Figure 10:
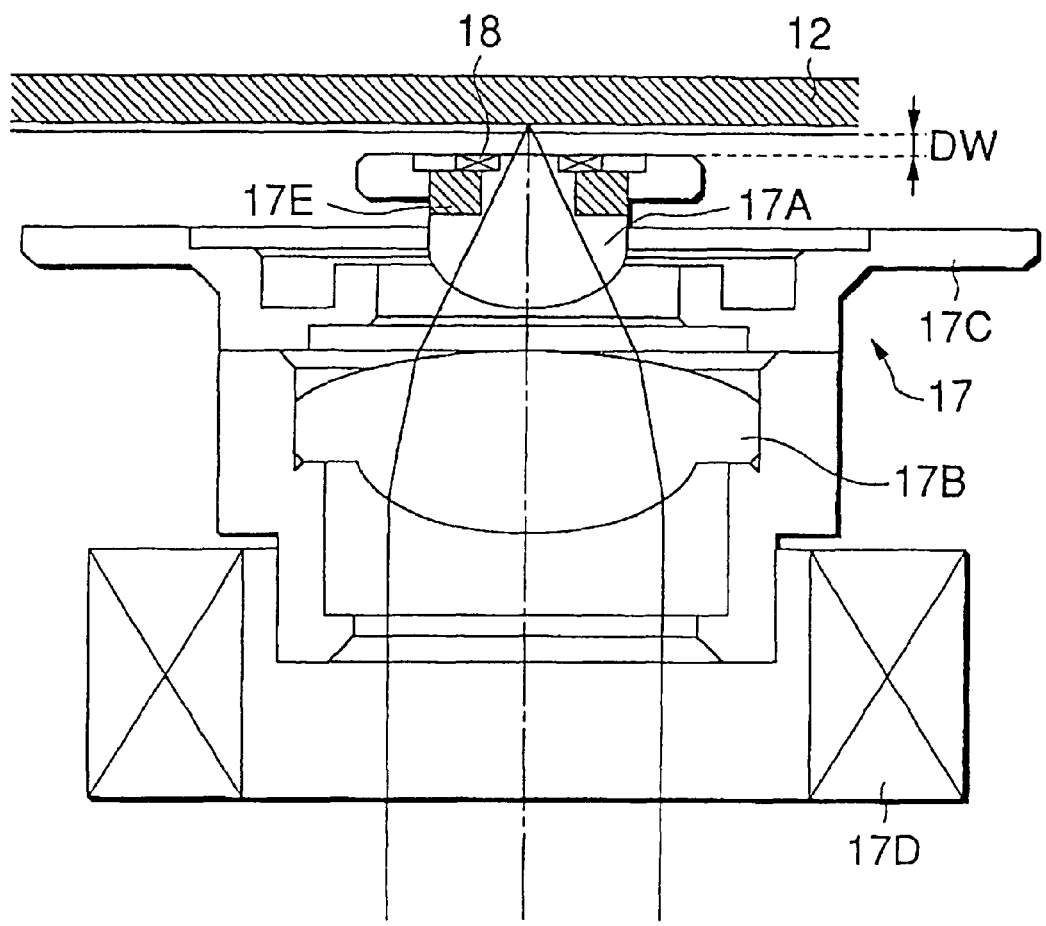
FIG. 10 is a sectional view for represents an objective lens and a peripheral structure thereof employed in the optical head of FIG. 9.

FIG. 10 is a sectional view for indicating the objective lens 17 of this optical head 11 and the peripheral structure thereof.

This objective lens 17 is constructed of a first lens 17A and a second lens 17B. In this case, both the first lens 17A and the second lens 17B are made of a spherical plastic lenses. These first and second lenses 17A and 17B are integrally held by a predetermined holding member 17C, and are movable along upper/lower/right/left directions, as viewed in this drawing, by a drive actuator 17D. As a result, in the optical disk apparatus 10, both the first lens 17A and the second lens 17B are integrally moved so as to execute a tracking control operation and a focusing control operation.

Furthermore, focal distances thereof and an interval between the first lens 17A and the second lens 17B are set in such a manner that the second lens 17B positioned on the side of the laser beam incident side is formed to have a relatively large aperture, whereas the first lens 17A provided on the side of the optical disk 12 is formed to have a relatively small aperture, and thus, the numerical aperture of the entire objective lens 17 becomes 0.78.

As a result, the objective lens 17 can satisfy the below-mentioned relation formulae (2) and (3). It should be noted that symbol "$\lambda$" indicates a wavelength of a laser beam, symbol "NA" shows a numerical aperture of the objective lens 17, symbol "t" represents a thickness of a light transmission layer of the optical disk 12, symbol "$\Delta t$" shows a fluctuation of the thickness "t", and further symbol "$\theta$" denotes a skew margin of the optical disk 12.

$$\theta \leq \pm 84.115 \times (\lambda/NA^3/t) \qquad (2),$$

$$\Delta t \leq \pm 5.26 \times \frac{\lambda}{NA^4} [\mu m]. \qquad (3)$$

The above-described formula (2) represents a relationship between the optical system and the skew margin "$\theta$" accessible to the optical disk under stable condition. Among the presently masproduced compact disks which are commercially available, the typical skew margin is selected to be on the order of 0.6 degrees. Also, among the commercially available DVDs, the skew margin "$\theta$" is selected to be on the order of 0.4 degrees. As a consequence, in accordance with this embodiment, as to the optical disk 12, even when the thickness of the light transmission layer is set to 0.1 [mm], and also the numerical number NA of the optical system is set to a relatively large value, this optical disk 12 can be stably accessed under practical condition.

Also, the formula (3) indicates the fluctuation in the thickness "t" of the light transmission layer allowable to the optical system, and a constant of 0.526 is calculated on the basis of a compact disk. In a compact disk, $\Delta t$ is selected to be +100 [$\mu$m] to −100 [$\mu$m], whereas in a DVD, $\Delta t$ is selected to be +30 [$\mu$m] to −30 [$\mu$m]. As a consequence, in this optical disk apparatus 10, even when the thickness "t" of the light transmission layer is fluctuated, the optical disk 12 can be stably accessed.

As a consequence, the optical head 11 is capable of satisfying the below-mentioned formula (4) by irradiating the laser beam having the wavelength of 650 [$\mu$nm] via the optical system having the numerical number of 0.78 onto the optical disk 12:

$$8 \approx 4.7 \times \left[\frac{0.65}{0.60} \times \frac{NA}{\lambda}\right]^2. \qquad (4)$$

In this formula (4), numeral 4.7 indicates a recording capacity [GB] of a DVD, and numerals 0.65 and 0.6 show the wavelength [nm] of the laser beam on the DVD, and the numerical aperture of the optical system. As a result, in the optical head 11, the data process is carried out with the same format as that of the DVD, so that the recording capacity of about 8 [GB] can be secured.

In the objective lens 17 manufactured in the above manner, the first lens 17A is held in such a manner that this first lens 17A is projected to the optical disk side. As a result, this first lens 17A is held by a working distance DW required by this numerical number. It should be noted that in this embodiment, the working distance DW is set to approximately 560 [$\mu$m] by selecting the characteristics and the arrangement of the first lens 17A and the second lens 17B. As a consequence, in this optical head 11, the allowable decentering degree and the allowable plane angle degree between the lens surfaces of the objective lens 17, and also the radius curvature of the lens may be set to such a practical range that the optical head 11 can be satisfactorily masproduced. Also, the overall shape of the optical head may be made compact. Moreover, collision by the optical head 11 with the optical disk 12 can be effectively avoided.

In other words, when a numerical aperture of an optical head is increased, assuming now that a laser beam having the same beam diameter is entered into an objective lens, this objective lens must be arranged close to an information recording plane of the optical disk. As a result, when the optical head is tried to be arranged with maintaining a sufficient interval with respect to the optical disk, the beam diameter of this laser beam must be considerably increased, as compared with the conventional beam diameter. To the contrary, the beam diameter of the laser beam owns such a practical upper limit value of the order of 4.5 [mm] which is substantially equal to that of the DVD.

In contrast thereto, when the optical head is positioned close to the optical disk, the beam diameter of the laser beam is accordingly made smaller, and furthermore the shape of the optical system is made compact, the manufacturing precision/arranging precision of the objective lens must be increased. Moreover, there is a risk that the optical head may collide with the optical disk. Under such a circumstance, in accordance with this embodiment, the working distance DW is set to be on the order of 560 [$\mu$m], by which these conditions can be satisfied.

In addition, in this objective lens 17, the lens surface of the first lens 17A on the side of the optical disk 12 is made flat. As a result, even when the optical disk 12 is skewed, this object lens 17 does not collide with the light transmission layer.

In addition, the first objective lens 17A is formed in such a way that the diameter thereof on the side of the optical disk 12 is decreased in a stepwise manner, and the lens surface thereof on the side of the optical disk 12 is made narrow, by which the laser beam can be sufficiently conducted to the optical disk 12.

A modulating coil 18 is arranged in such a manner that a tip side of this first lens 17A is surrounded by this modulating coil 18, and the side surface thereof on the side of the optical disk 12 is made substantially flat with respect to the lens surface of the first lens 17A. As a result, the modulating coil 18 is arranged close to the optical disk 12 as being permitted as possible within such a range that this modulating coil 18 is not projected from the lens surface of the first lens 17A, so that the modulating magnetic field can be effectively applied to the laser beam irradiation position.

Moreover, the temperature increase of this modulating coil 18 is reduced by a heat radiation plate 17E which is arranged on the side of the first lens 17A in such a manner that this first lens 17A is surrounded by the heat radiation plate 17E. As a consequence, various sorts of characteristic changes caused by the temperature increase can be suppressed within a practically sufficient range.

In the optical disk apparatus 10 shown in FIG. 8, the spindle motor 33 rotates the optical disk 12 under control of a system control circuit 34. At this time, the spindle motor 33 may rotate the optical disk 12 in a so-called "ZCLV (Zone Constant Linear Velocity)" by rotary-driving the optical disk 12 in such a way that a reading/writing clock R/W ck produced from a PLL circuit 35 may have a constant frequency.

A thread motor 36 may move the optical head 11 along the radial direction of the optical disk 12 under control of the system control circuit 34, so that a seek operation can be carried out in the optical disk apparatus 10.

Upon receipt of the push-pull signal PP outputted from the optical head 11, a frame address detecting circuit 37 extracts the wobble signal by using a built-in band-pass filter. Furthermore, the frame address detecting circuit 37 detects a phase change occurred in this wobble signal and then executes a preselected signal process operation for this detected phase change, so that the wobble data ADIP is demodulated. Thus, the frame address detecting circuit 37 supplies this demodulated wobble data ADIP to the system control circuit 34 and the cluster counter 38. As a result, in the optical disk apparatus 10, the system control circuit 34 can roughly specify the laser beam irradiation position based upon this wobble data ADIP. Also, in the cluster counter 38, frame synchronization timing can be confirmed.

In addition, when this wobble data ADIP is outputted, the frame address detecting circuit 37 executes the error detecting process operation based upon the error detection code CRC allocated to each of these wobble data frames, and then removes the error detection code and the reserve bit from such wobble data ADIP which can be judged as the correct wobble data. Thereafter, this frame address detecting circuit 37 outputs the removed wobble data ADIP.

A wobble signal detecting circuit 39 supplies the push-pull signal PP outputted from the optical head 11 to a band-pass filter 39A so as to extract the wobble signal WB therefrom. The wobble signal detecting circuit 39 further digitalizes the wobble signal WB on the basis of a 0 level in a comparing circuit (COM) 39B subsequent to the band-pass filter 39A, so that edge information of the wobble signal WB is extracted.

In response to this digitalized binary signal S1, a wobbling period detecting circuit 40 judges as to whether or not the wobble signal WB is changed from the correct period by checking the timing of the edge corresponding thereto on the basis of the timing of each edge of this binary signal S1. Furthermore, the wobbling period detecting circuit 40 selectively outputs the edge information judged as the correct period to the PLL circuit 35. As a result, the wobbling period detecting circuit 40 is employed in order that the clock CK is not shifted by dust and the like adhered to the optical disk 12.

Figure 11:
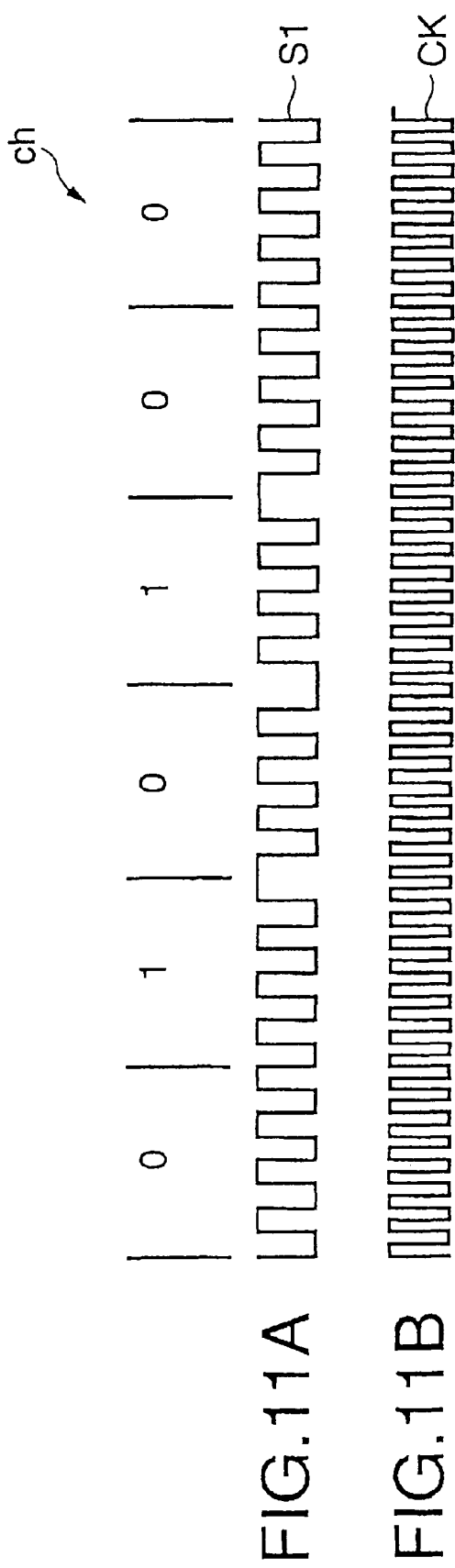
FIG. 11 shows a signal waveform chart for explaining a clock generation by the optical disk apparatus of FIG. 8.

The PLL circuit 35 supplies the binary signal outputted from the wobbling period detecting circuit 40 to a phase comparing circuit (PC) 35A. In this phase comparing circuit 35A, the phase of this binary signal is compared with the phase of the clock CK outputted from a frequency dividing circuit 35B. In this case, as shown in FIG. 11, the frequency dividing circuit 35B outputs such a clock CK (see FIG. 11B) having a frequency two times higher than that of the binary signal S1 (FIG. 11A) by being set by the system control circuit 34. To the contrary, the wobble signal WB is phase-shifted in the mastering apparatus 1, so that the respective edges of this phase-shifted wobble signal WB may own the correct phase information.

In this PLL circuit 35, a low frequency component of the phase-compared signal is extracted by a low-pass filter (LPF) 35C, and an oscillation frequency of a voltage-controlled type oscillator circuit (VCO) 36D is controlled by using this low frequency component. Moreover, the oscillation output signal derived from this voltage-controlled type oscillator circuit 36D is frequency-divided by a frequency dividing circuit 35B. As a result, the frequency dividing circuit 35B can produce the clock CK in high precision.

In the PLL circuit 35, the frequency dividing circuit 35B is set by the system control circuit 34 in such a manner that the frequency dividing ratio thereof is sequentially increased in accordance with the shift operation of the laser beam irradiation position toward the outer peripheral side of the optical disk 12. As a result, in this PLL circuit 35, the frequency of the oscillation signal outputted from the voltage-controlled oscillator circuit 36D is sequentially increased in a stepwise manner with respect to the frequency of the wobble signal WB in accordance with the shift operation of the laser beam irradiation position toward the outer peripheral side of the optical disk 12, and this oscillation signal is outputted as the reading/writing clock R/W CK.

In the optical disk apparatus 10, the optical disk 12 is rotated in order that this reading/writing clock R/W CK may have a constant frequency, and also the desirable data is recorded on the basis of this reading/writing clock R/W CK in order that the line recording density on the inner peripheral side of the optical disk 12 and the line recording density on the outer peripheral side thereof are not greatly changed. As a consequence, the resultant recording density of this optical disk 12 can be increased.

On the basis of the detection result from the frame address detecting circuit 37, the cluster counter 38 counts the reading/writing clock R/W CK, so that the laser beam irradiation position can be specified in high precision based on this reading/writing clock R/W CK. In response to the count result, the cluster counter 38 outputs a cluster start pulse to the system control circuit 34. It should be understood that a cluster is equal to a unit of data recorded/reproduced with respect to the optical disk 12, and a cluster pulse corresponds to a pulse used to instruct starting timing of this cluster.

In this process operation, the cluster counter 38 executes an interpolation process for the wobble data ADIP, and also outputs the cluster start pulse by way of the synchronization process operation executed on the basis of the count result of the reading/writing clock R/W CK in such a case that the wobble data ADIP is not detected by the frame address detecting circuit 37 due to, for example, dust adhered on the disk surface.

The system control circuit 34 is arranged by such a computer capable of controlling an overall operation of this optical disk apparatus 10. In response to the sequentially inputted wobble data ADIP, this system control circuit 34 controls the operations of the thread mother 36 and the like. Also, when the overall operation mode is switched, this system control circuit 34 may control the entire operation in accordance with the laser beam irradiation position, and furthermore in response to a control instruction issued from an external appliance.

In a series of the above-described process operations, the system control circuit 34 switches the frequency dividing ratios of the frequency dividing circuit 35B based on the data related to the frequency dividing ratios stored in the memory 42 in response to the laser beam irradiation position defined by the track number as a reference.

Figure 12:
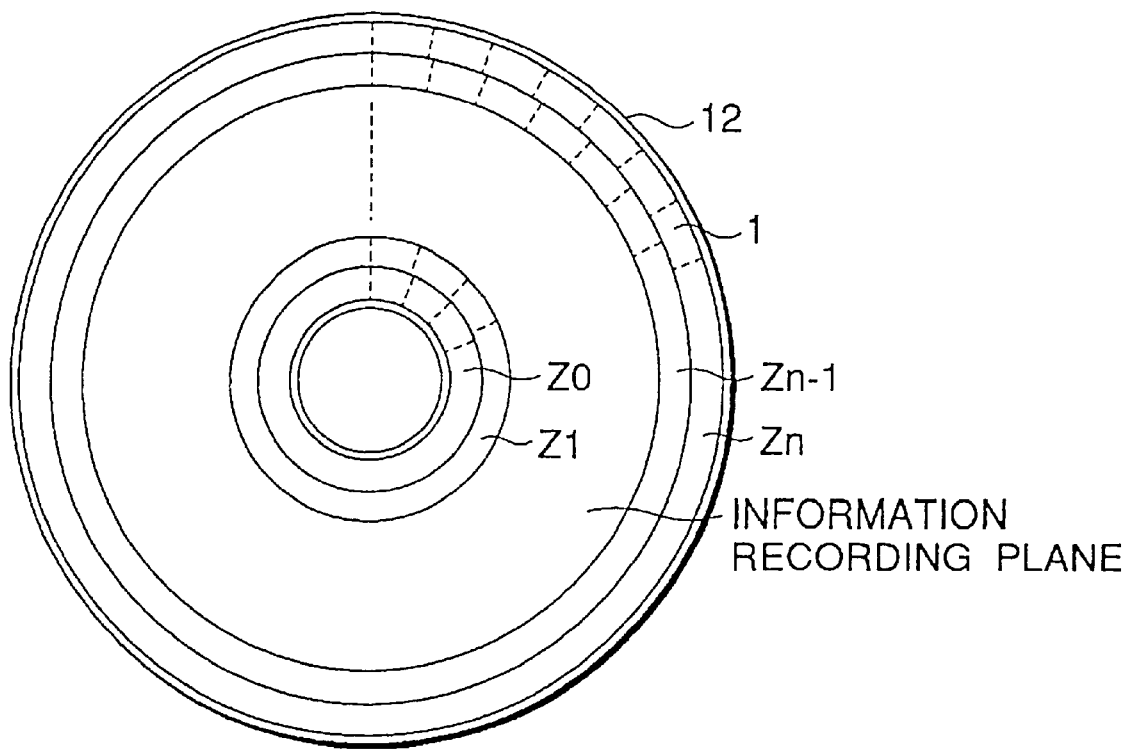
FIG. 12 is a plan view used to describe optical disk drive operation by the optical disk apparatus of FIG. 8.

As a consequence, as indicated in FIG. 12, the system control circuit 34 subdivides the information recording plane of the optical disk 12 into a plurality of zones Z0, Z1, . . . Zn-1, and Zn in a coaxial shape, and sequentially reduces the rotation speed of the optical disk in a stepwise manner from the zone on the inner peripheral side toward the zone on the outer peripheral side, so that the recording density of the zone on the inner peripheral side is made equal to the recording density of the zone on the outer peripheral side.

At this time, in response to the cluster start pulse outputted from the cluster counter 38, the system control circuit 34 executes the reading/writing control operations to subdivide the respective zones in a radial shape, and allocates data of 1 cluster to each of the subdivided region. As a consequence, the system control circuit 34 is designed to sequentially increase the cluster numbers of the respective zones from the zone on the inner peripheral side to the zone on the outer peripheral side.

It should also be noted that the region of the optical disk defined from the diameter of 24 [mm] to the diameter of 58 [mm] is subdivided into 81 zones every 840 tracks in the optical disk apparatus 10. Moreover, 1 track on the zone Z0 on the outermost peripheral side is subdivided in a radial form to form 964 frames. Furthermore, in the zones on the outer peripheral side, each of the tracks is subdivided in order that the frame number is sequentially increased every 16 frames. In this optical disk apparatus 10, the data of 1 cluster is allocated to the continuous 420 frames formed in this manner.

In addition, the system control circuit 34 instructs a tracking servo circuit (not shown) that the movable direction of the objective lens 17 is switched with respect to the polarity of the tracking error signal. As a consequence, the scanning operation of the laser beam is switched to the scanning operations for the grooves, and the land between the grooves by this system control circuit 34. Accordingly, a so-called "land/groove recording operation" can be performed in this optical disk apparatus 10.

Figure 13:
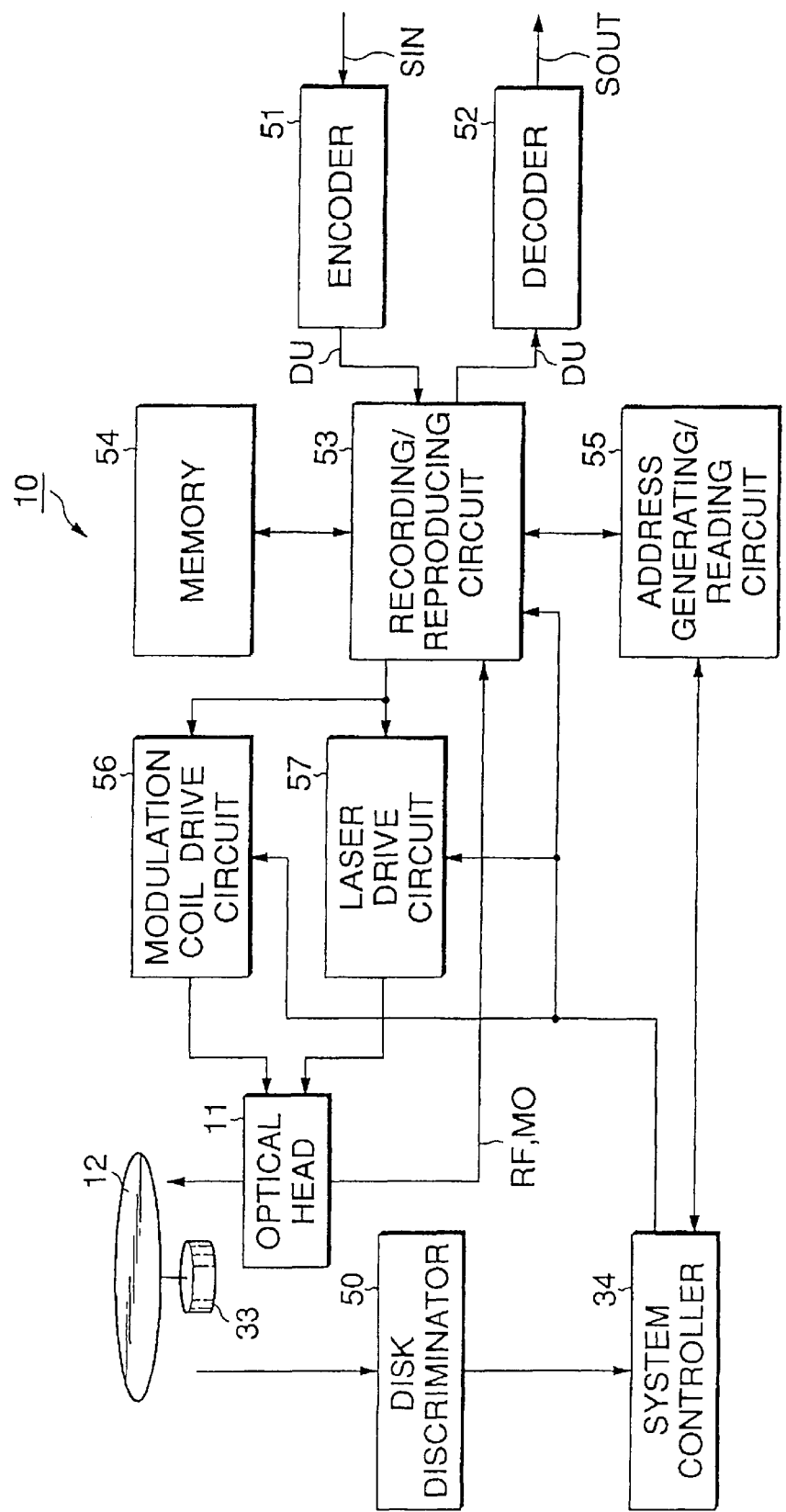
FIG. 13 is a schematic block diagram for indicating a data process system employed in the optical disk apparatus of FIG. 8.

FIG. 13 is a schematic block diagram for representing a data recording/reproducing system of this optical disk apparatus 10. In this optical disk apparatus 10, a disk discriminator 50 discriminates the sort of the optical disk 12 by, for example, checking an concave formed in a cartridge thereof, and then outputs a discrimination signal to the system control circuit 34. As a result, the optical disk apparatus 10 switches the operation of the recording/reproducing system and therefore is accessible to various sorts of optical disks, depending upon the sort of the mounted optical disk 12.

In this case, an encoder 51 enters therein an input signal SIN made of a video signal and an audio signal derived from an external appliance during the recording operation and the editing operation. After these video signal and audio signal are A/D-converted into video data and audio data, this encoder 51 compresses these video/audio data in accordance with the MPEG (Moving Picture Experts Group) standardized format so as to produce user data DU.

Contrary to the encoder 51, a decoder 52 expands the user data DU outputted from a recording/reproducing circuit 53 based upon the MPEG standardized format to thereby produce a digital video signal and a digital audio signal during the recording operation and the editing operation. These digital video and audio signals are D/A-converted into an analog video/audio signal "SOUT", which will then be outputted.

Figure 14:
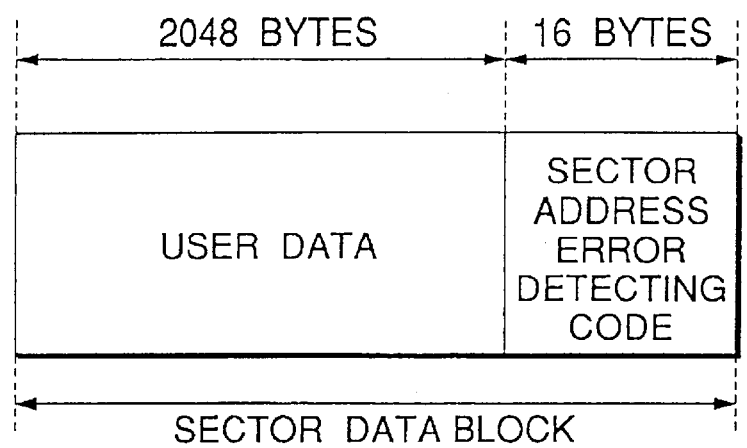
FIG. 14 explanatorily shows a sector data block structure used in the optical disk apparatus of FIG. 13.

During the recording operation and the editing operation, the recording/reproducing circuit 53 stores the user data DU outputted from the encoder 51 into a memory 54, and also processes this user data DU in a unit of a preselected block to thereby record the processed user data on the optical disk 12. In other words, as indicated in FIG. 14, the recording/reproducing circuit 53 sequentially subdivides the user data DU into blocks in a unit of 2048 bytes, and adds a 16-byte sector address and a 16-byte error correction code to each of these subdivided blocks. The recording/reproducing circuit 53 forms a sector data block made by 2048 bytes+16 bytes. The sector address corresponds to this address data of this sector address block, and the error detection code corresponds to an error detection code of this sector address.

Figure 15:
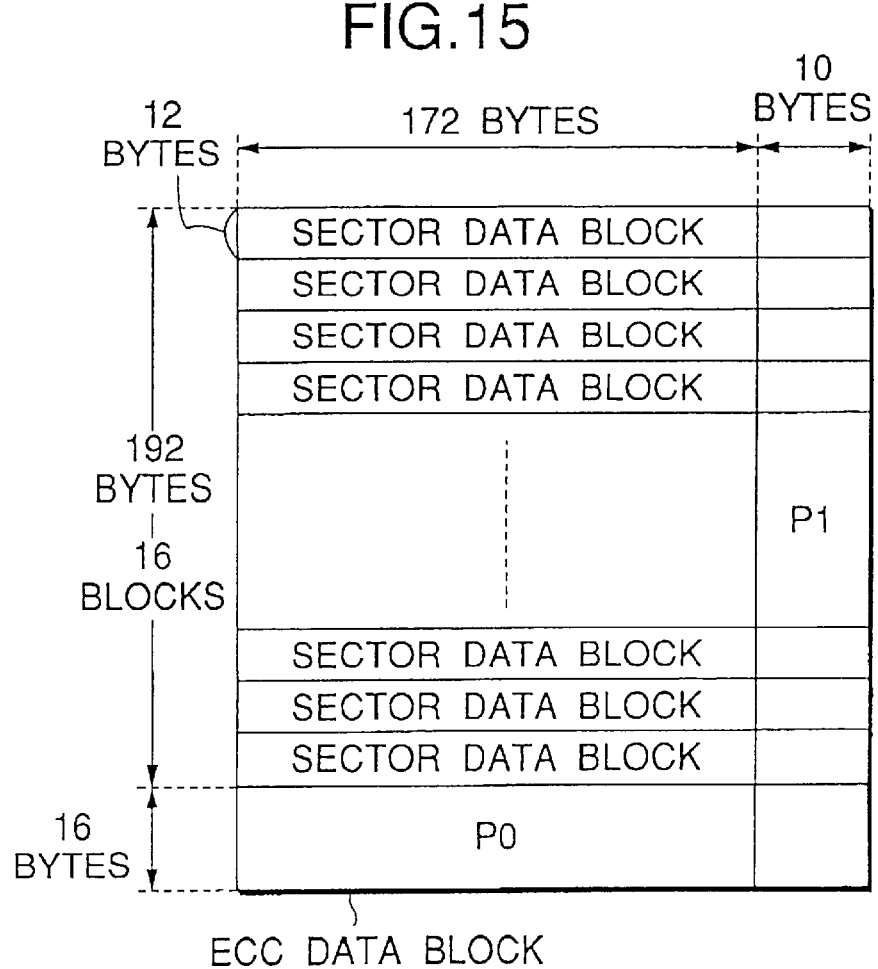
FIG. 15 explanatorily represents an ECC data block structure used in the optical disk apparatus of FIG. 13.

As indicated in FIG. 15, the recording/reproducing circuit 53 further produces an ECC data block (182 bytes ×208 bytes) based upon 16 sector data blocks. That is, in the drawing, the recording/reproducing circuit 53 sequentially arranges 16 pieces of the sector data blocks constituted by 2048 bytes×16 bytes in a unit of 172 bytes in the raster scanning order, and then produces an error correction code (PI) made of inner codes along a lateral direction. Also, this recording/reproducing circuit 53 produces another error correction code (PO) made of outer codes along a longitudinal direction.

Figure 16:
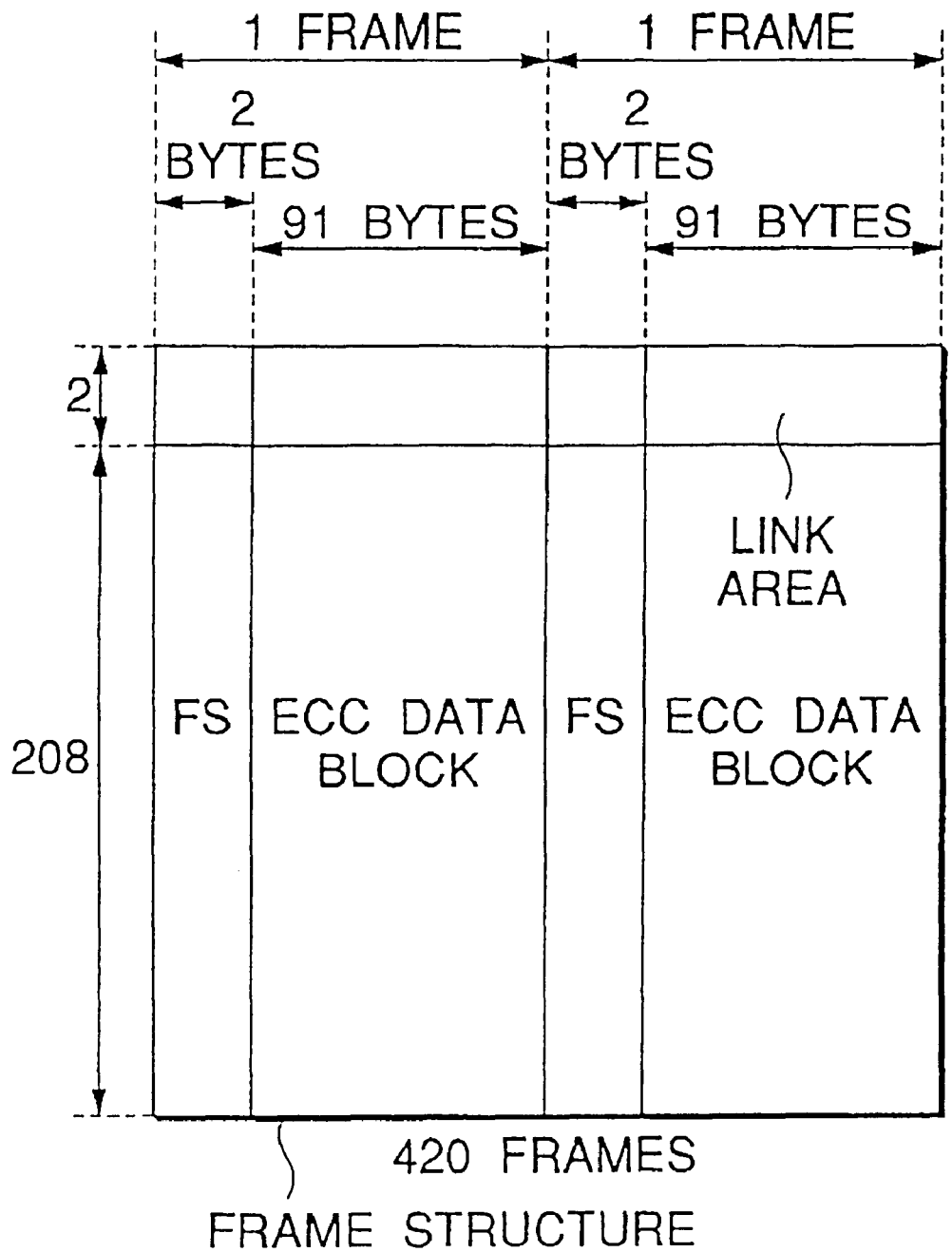
FIG. 16 explanatorily indicates a frame structure used in the optical disk apparatus of FIG. 13.

The recording/reproducing circuit 53 interleaves this ECC block to form a frame structure, as indicated in FIG. 16. That is to say, this recording/reproducing circuit 53 allocates a 2-byte frame sync signal (FS) to each of 91-byte data blocks contained in the ECC data block constructed of 182 bytes ×208 bytes. As a result, 208 frames are formed by one ECC data block. In addition, as to these 208 frames, a link frame of 2×2 frames is allocated. As a consequence, the recording/reproducing circuit 53 forms data of 1 cluster with a frame structure shown in FIG. 16.

Figure 17:
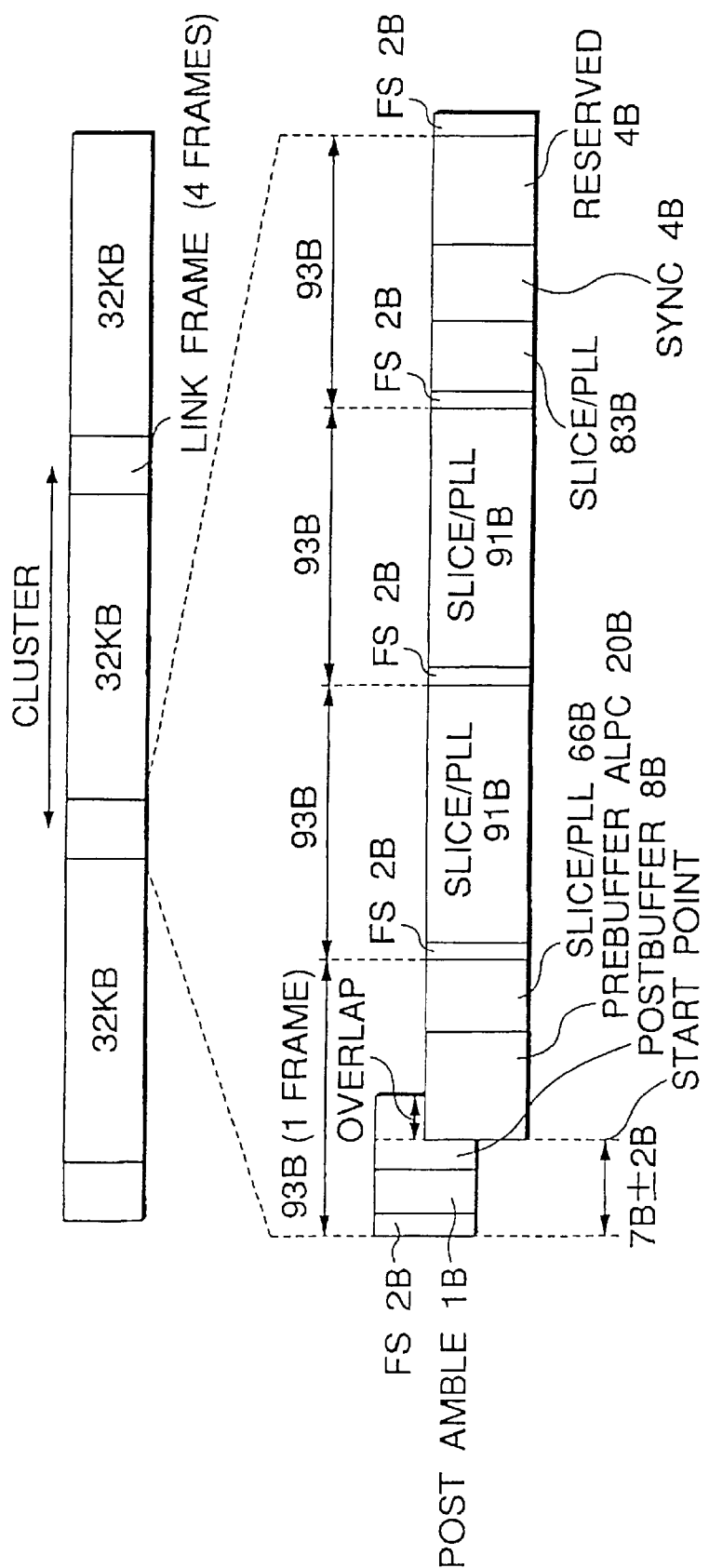
FIG. 17 explanatorily represents a cluster used in the optical disk apparatus of FIG. 13.

The link frame among these frames is used for buffering between the adjoining clusters when the data is recorded on the optical disk 12 in the unit of this cluster. That is, as represented in FIG. 17, the recording/reproducing circuit 53 sequentially records both the 86-byte data and 3 sets of the link frames on the optical disk 12. Subsequently, this recording/reproducing circuit 53 sequentially records the frames made by the ECC blocks on the optical disk 12. A 20-byte head frame among these frames is used as a prebuffer for absorbing a shift in a cluster starting position, and a light amount adjusting ALPC (Automatic Laser Power Control) for a laser beam. Subsequently, a slice level adjusting region and a PLL synchronizing region (Slice/PLL) are sequentially allocated by sandwiching the frame sync signal (FS). Also, to a trail frame on the head side, a 4-byte sync pattern (sync) and a reserve region (Reserved) are set.

In contrast, subsequent to the frame sync signal (FS), a 1-byte postamble (Postamble) and an 8-byte postbuffer (Postbuffer) are allocated to a trail portion of the frame constructed of the ECC block. The clusters subsequently to be recorded are overlapped with each other between the postbuffers. It should be understood that the postamble is employed so as to adjust the mark length of the data, or set the polarity of the signal to a predetermined value, whereas the postbuffer is employed so as to absorb the jitter components caused by the decentering and the recording sensitivities.

During the recording operation, the recording/reproducing circuit 53 modulates the data arranged in the above-described manner by the modulation method suitable for the data recording operation of the optical disk 12, and outputs the modulated data. At this time, after a data stream to be recorded on the optical disk has been modulated by the (1, 7) RLL modulation method, the recording/reproducing circuit 53 performs a calculation process among the continuous bit streams to output the calculated bit stream. When the calculated bit stream is outputted, the recording/reproducing circuit 53 converts this bit stream into the user data DU which will be then outputted at a data transfer speed of 11.08 [Mbps]. As a result, this recording/reproducing circuit 53 may intermittently output the converted user data at such a higher data transfer speed than the data transfer speed of the user data DU entered from the encoder 51. Accordingly, the recording/reproducing circuit 53 can record the continuous user data while utilizing the empty time which can be produced by intermittently recording the user data DU even when the optical head 11 detracks due to vibrations.

When this data is recorded, the recording/reproducing circuit 53 outputs the data which has been modulated on the basis of the above-explained reading/writing clock R/W CK with reference to FIG. 8, and commences to output the data which has been modulated on the basis of the timing detected by the cluster counter 38 under control of the system control circuit 34.

Furthermore, during the reproducing operation, the recording/reproducing circuit 53 amplifies the reproduction signals RF and MO entered from the optical head 11, and thereafter digitalizes the amplified signals to produce binary signal. In addition, the recording/reproducing circuit 53 reproduces a clock from the reproduction signals RF and MO based on this binary signal. The reproduced clock corresponds to the reading/writing clock R/W CK. Moreover, the recording/reproducing circuit 53 sequentially latches the binary signal on the basis of the reproduced clock to thereby detect the reproduced data. The recording/reproducing circuit 53 executes the setting operation of the slice level when this digitalizing operation is carried out, and executes the capture operation of the PLL circuit for the clock reproducing operation in the link frame.

The recording/reproducing circuit 53 decodes this reproduction data by applying the PRML (Partial-Response Maximum-Likelihood) method to thereby produce decoded data. Furthermore, the recording/reproducing circuit 53 deinterleaves this decoded data, and then error-corrects the deinterleaved data to output the error-corrected data to the decoder 52.

As a result, in the DVD, the (1, 7) PLL-modulated data is recorded by the minimum short pit length of 0.4 [$\mu$m]. When the recording/reproducing system is formed by simply converting the margin by the numerical aperture by the same margin as that of the DVD, the desirable data can be recorded/reproduced by using the minimum short pit length of 0.23 [$\mu$m]. To the contrary, if the interference among the codes is actively utilized by the PRML method, then a similar margin shorter than, or equal to the minimum pit length of 0.23 [$\mu$m] may be secured.

At this time, similar to the recording operation, the recording/reproducing circuit 53 intermittently reproduces the data from the optical disk 12 in the unit of the cluster at the data transfer speed of 11.08 [Mbps] converted as the user data DU, and then continuously outputs the reproduced user data DU to the decoder 52.

While executing a series of the above-described reproducing operation, under control of the system control circuit 34, when the optical disk 12 is the magneto-optical disk, the recording/reproducing circuit 53 selectively processes the reproduction signal MO whose signal level is varied in accordance with the polarization plane to thereby reproduce the user data DU. When the optical disk 12 is the reproduction-only optical disk, the write once type optical disk, or the phase change type optical disk, this recording/reproducing circuit 53 selectively processes the reproduction signal RF whose signal level is changed in response to the light amount change in the return light to thereby reproduce the user data DU. Furthermore, even when the optical disk 12 is the magneto-optical disk, in such a case that the read-in area on the inner peripheral side thereof is reproduced, the recording/reproducing circuit 53 selectively processes the reproduction signal RF to thereby reproduce the user data DU.

During the recording operation, an address reading circuit 55 produces address data which is added to each of the sector data blocks, and then outputs the address data to the recording/reproducing circuit 53. During the reproducing operation, this address reading circuit 55 analyzes the address data detected by the recording/reproducing circuit 53 to notify the analyzed address data to the system control circuit 34.

During the writing operation, when the optical disk 12 is the magneto-optical disk, a laser drive circuit 57 drives the semiconductor laser of the optical head 11 at such timing which is synchronized with the reading/writing clock R/W CK under control of the system control circuit 34, so that a light amount of a laser beam is intermittently rised.

During the writing operation, when the optical disk 12 is the phase change type optical disk, or the write once type optical disk, the laser drive circuit 57 intermittently rises the light amount of the laser beam under control of the system control circuit 34, in response to the output data from the recording/reproducing circuit 53, so that the user data DU is recorded on the optical disk 12.

To the contrary, during the reading operation, the laser drive circuit 57 holds the light amount of the laser beam at a constant low level.

When the optical disk 12 is the magneto-optical disk, a modulating coil drive circuit 56 starts up the recording operation under control of the system control circuit 34, and then drives the modulating coil of the optical head 11 in response to the output data from the recording/reproducing circuit 53. As a consequence, the modulating coil drive circuit 56 applies the modulated magnetic field to the laser beam irradiation position where the light amount of the laser beam is intermittently rised, so that the user data DU is recorded by the thermal magnetic recording method.

With the above-described arrangement, in the mastering apparatus 1 (see FIG. 3), while the master disk 2 is rotated under such a condition that the angular velocity is constant, since the laser beam "L" is irradiated onto this mother disk 2 in the helical form from the inner peripheral side thereof toward the outer peripheral side, the shape of the groove is formed with the interval of approximately 1.0 [$\mu$m]. Thus, this groove shape is wobbled in response to the wobbling signal WB.

At this time, in the mastering apparatus 1, such a track number "Track" which is sequentially incremented every time the mother disk 2 is rotated by 1 turn, and such a frame number "Frame" which is sequentially incremented every time the mother disk 2 is rotated by 1/16 turn are produced. Then, a predetermined wobble data frame (see FIG. 4) is formed by these track number "Track" and frame number "Frame". This wobble data frame is entered as the wobble data ADID by the serial data stream into the wobble signal generating circuit 7.

In this case, the wobble data ADIP is biphase-mark-modulated (see FIG. 5) in the biphase mark modulating circuit 7C, and the sync patten is added to the modulated wobble data. Subsequently, in the phase modulating circuit 7E, a first carrier signal and a second carrier signal having a different phase from that of the first carrier signal by 180 degrees are allocated to the respective channels so as to be phase-modulated, so that the wobble signal WB is generated. As a consequence, the wobble signal WB is produced by a single carrier frequency.

Accordingly, in the manufacturing step of the optical disk according to this embodiment mode, the optical disk 12 is manufactured from the mother disk 2 through a predetermined manufacturing step by this mastering apparatus 1. In this optical disk 12, the wobbling period of the groove is converted into the rotation angles of the optical disk 12, and these rotation angles are made constant in the respective regions (see FIG. 6 and FIG. 7). Also, a plurality of address data are allocated by this groove while the optical disk 12 is rotated by 1 turn.

In the optical disk apparatus 10 (see FIG. 8), the process operation such as the spindle control is carried out for this optical disk 12 on the basis of the wobble of the groove formed in this manner. At this time, the PLL circuit 35 produces the clock CK having the high precision on the basis of the wobbling groove, and also the timing is detected by the cluster counter 38.

In other words, in this wobble signal detecting circuit 39, the wobble signal WB is extracted by the band-pass filter 39A from the push-pull signal PP whose signal level is changed in response to the laser beam irradiation position with respect to the groove. Subsequently, this wobble signal WB is digitalized by the comparing circuit 39B to extract the edge information. In the PLL circuit 35, the phase of the wobble signal WB is synchronized with the phase of the frequency divided signal CK output from the frequency dividing circuit 35B, which owns the frequency two times higher than that of the wobble signal WB, so that the reading/writing clock R/W CK is generated.

At this time, since the wobble signal WB is produced from the carrier signal having the single frequency, the respective edge information owns the correct phase information as to the edge information obtained from the digitalizing process. As a result, the reading/writing clock R/W CK with high precision can be produced in phase-synchronism with this edge information.

Further, the reading/writing clock R/W CK is counted by the cluster counter 38 on the basis of the frame-synchronized timing detected by the frame address detecting circuit 37. As a result, the timing for the writing operation and the reading operation is set in the recording/reproducing circuit 53 (see FIG. 13). At this time, since this timing is set while using the reading/writing clock R/W CK having the high precision as the reference clock, the optical disk apparatus 10 can judge the laser beam irradiation position with high precession so as to set the writing timing. As a consequence, when the user data is recorded on the optical disk 12, the information recording plane of the optical disk 12 can be utilized in high density and thus these user data can be recorded.

Furthermore, in the PLL circuit 35, the frequency dividing ratio of the frequency dividing circuit 35B is switched in response to the laser beam irradiation position, so that the optical disk 12 is rotated by the ZCLV manner.

At this time, since the wobbling periods of the grooves are made constant in the respective regions while being converted into the rotation angles, the synchronization of the PLL circuit 35 can be quickly established in the respective zones, so that the access speeds can be accordingly increased.

In accordance with the above-described arrangement, after the wobble data has been biphase-mark-modulated, the sync pattern is inserted into the modulated wobble data so as to phase-modulate the wobble data, so that the wobble signal can be produced with a single carrier frequency. As a result, the clock having the high precision can be generated so that the laser beam irradiation position can be specified in the high precision.

Also, at this time, while the mother disk 2 is rotated under condition of the constant angular speed, since the wobbling periods of the grooves are made constant in the respective regions with being converted into the rotation angles, the synchronization of the PLL circuit 35 can be quickly established in the respective zones, so that the access speeds can be accordingly increased.

The above-explained embodiment has described such a case that the phase modulation is carried out by using the first and second carrier signals having the different phases by 180 degrees. The present invention is not limited to this embodiment. For instance, the phase modulation may be carried out by using first and second carrier signals having different phases by 90 degrees.

Further, the above-explained embodiment has described such a case that the phase-modulated signal is directly used as the wobble signal, but the present invention is not limited thereto. Alternatively, the present invention may be widely applied to another case that, for example, a reference signal having a very short time period, as compared with that of this phase-modulated signal, is inserted at timing corresponding to a bit center of the wobble data.

Further, the above-explained embodiment has described such a case that the sync pattern is added to the wobble data, and the resulting wobble data is phase-modulated, but the present invention is not limited thereto. Alternatively, the present invention may be widely applied to another case that the sync pattern is omitted, if required.

Further, the above-explained embodiment has described such a case that the wobble data is produced from both the error detection code and the address data constructed of the track number and the frame number, but the present invention is not limited thereto. Alternatively, the present invention may be widely applied to another case that this error detection code is omitted when the desirable wobble data may be practivelly produced. For instance, the desirable wobble data may be practically produced with having sufficient reliability by repeating the same track number, or the same frame number, or by comparing these track numbers with frame number.

Further, the above-explained embodiment has described such a case that the address data is formed by employing the track numbers and the frame numbers, the values of which are sequentially changed, but the present invention is not limited thereto. Alternatively, the present invention may be widely applied to another case that, for example, the address data is produced by basing a grey code.

Further, the above-explained embodiment has described such a case that the wobble signal is produced by using the address data constituted by the track number and the frame number, but the present invention is not limited thereto. Alternatively, the present invention may be widely applied to another case that the wobble signal is generated by using such address data made of time information.

Further, the above-explained embodiment has described such a case that the mother disk is rotated under such a condition of the constant angular velocity, but the present invention is not limited thereto. Alternatively, the present invention may be widely applied to another case that the mother disk is rotated under such a condition of a constant linear velocity, and a wobble periods of the grooves which have been converted into the linear velocities become constant. Also, the present invention may be applied to further cases that the wobble periods of the grooves which have been converted into the linear velocities may be changed in a stepwise manner along the radial direction of the optical disk. Furthermore, the wobble periods of the grooves which have been converted into the angular velocities may be changed in a stepwise manner along the radial direction of the optical disk.

Further, the above-explained embodiment has described such a case that the grooves are formed in such a way that the track pitch becomes 0.5 [$\mu$m] in the land/groove recording operation, but the present invention is not limited thereto. Alternatively, the present invention may be widely applied to another case that the grooves may be formed based upon various pitches.

Further, the above-explained embodiment has described such a case that the entire groove is wobbled by using the wobble signal, but the present invention is not limited thereto. Alternatively, the present invention may be widely applied to another case that only a single-sided edge of the groove is wobbled, and both edges of the groove are wobbled by employing the wobble signal.

Further, the above-explained embodiment has described such a case that after the wobble signal is digitalized, the clock is generated in the PLL circuit, but the present invention is not limited thereto. Alternatively, the present invention may be widely applied to another case that the phases of the wobble signals are directly compared with each other to produce the clock in the PLL circuit.

Further, the above-explained embodiment has described such a case that the present invention is applied to the optical disk system having the storage capacity of 8 [GB], but the present invention is not limited thereto. Alternatively, the present invention may be widely applied to other various sorts of optical disks.

Moreover, the above-explained embodiment has described such a case that the present invention is applied to the recordable optical disk, but the present invention is not limited thereto. Alternatively, the present invention may be widely applied to reproduction-only optical disks.

As previously described in detail, according to the present invention, the wobble signal is produced by the phase modulation, and then the groove is wobbled based on this phase-modulated wobble signal. As a result, the wobble signal is generated by using a single carrier frequency so as to form the groove. As a consequence, the clock can be produced in the higher precision, and therefore the laser beam irradiation position can be specified in the higher precision.

What is claimed is:

1. A method for manufacturing an optical disk by preformatting predetermined serial data on said optical disk by using a groove, comprising the steps of:

phase-modulating said serial data to produce a phase-modulated serial data signal; and wobbling said groove in response to a signal level of said phase-modulated serial data signal, said optical disk being operable in an optical system having an objective lens that is positioned at a working distance of approximately 560 $\mu$m from said disk.

2. An optical disk manufacturing method as claimed in claim 1 wherein:

after said serial data is biphase-mark-modulated to produce a biphase-mark-modulated signal, said biphase-mark-modulated serial data signal is produced by using said biphase-mark-modulated signal.

3. An optical disk manufacturing method as claimed in claim 2 wherein:

a frequency of said biphase-mark-modulated signal is switched within a time period corresponding to each channel of said biphase-mark-modulated signal, and then said phase-modulated serial data signal is produced.

4. An optical disk manufacturing method as claimed in claim 1 wherein:

address data constructed of at least one of positional information and time information is allocated to said serial data.

5. An optical disk manufacturing method as claimed in claim 4 wherein:

an error detection code of said address data is allocated to said serial data, and a timing detecting reference signal is inserted into said phase-modulated serial data signal.

6. An optical disk manufacturing method as claimed in claim 4 wherein:

a plurality of said address data are allocated to said serial data while said groove is rotated by one turn.

7. An optical disk manufacturing method as claimed in claim 1 wherein:

said phase-modulated serial data signal is produced in such a manner that time periods of said wobble which have been converted into rotation angles of said optical disk become a constant value.

8. An optical disk on which predetermined serial data is preformatted by using a groove, wherein:

said groove is wobbled in response to a phase-modulated serial data signal, said optical disk being operable in an optical system having an objective lens that is positioned at a working distance of approximately 560 $\mu$m from said disk.

9. An optical disk as claimed in claim 8 wherein:

said phase-modulated serial data signal is produced from a biphase-mark-modulated signal which is produced by biphase-mark-modulating said serial data.

10. An optical disk as claimed in claim 9 wherein:

said groove is formed by switching a frequency of wobbling of said groove within a region corresponding to each channel of said biphase-mark-modulated signal.

11. An optical disk as claimed in claim 8 wherein:

address data constructed of at least one of positional information and time information is allocated to said serial data.

12. An optical disk as claimed in claim 11 wherein:

an error detection code of said address data is allocated to said serial data, and a timing detecting reference signal is inserted into said phase-modulated serial data signal.

13. An optical disk as claimed in claim 8 wherein:

a plurality of said address data are allocated to said serial data while said groove is rotated by one turn.

14. An optical disk as claimed in claim 8 wherein:

time periods of said wobble which have been converted into rotation angles of said optical disk become a constant value.

15. An optical disk as claimed in claim 8 wherein:

a width of said groove is substantially equal to a width defined between the adjoining grooves.

16. An optical disk apparatus for driving an optical disk on which predetermined serial data is preformatted by using a groove, comprising:

rotating means for rotating said optical disk in which said groove is wobbled in response to a phase-modulated serial data signal which is produced by phase-modulating said serial data;

an objective lens that is positioned at a working distance of approximately 560 $\mu$m from said disk;

light beam irradiating means for irradiating a light beam onto said optical disk;

detecting means for detecting light returned from said optical disk; and control means for controlling the rotation of said rotating means and/or the light irradiation position of said light beam irradiating means in response to the detection output from said detecting means.

17. An optical disk apparatus as claimed in claim 16 wherein:

said phase-modulated serial data signal of the groove formed on said optical disk is produced from a biphase-mark-modulated signal which is produced by biphase-mark-modulating said serial data.

18. An optical disk apparatus as claimed in claim 17 wherein:

said groove is formed by switching a frequency of wobbling of said groove within a region corresponding to each channel of said biphase-mark-modulated signal.

19. An optical disk apparatus as claimed in claim 16 wherein:

address data constructed of at least one of positional information and time information is allocated to said serial data which is preformatted on said optical disk.

20. An optical disk apparatus as claimed in claim 16 wherein:

said light beam irradiating means includes a light source for emitting a light beam, and light collecting means for collecting the light beam emitted from said light source onto said optical disk; and said light collecting means includes a first lens movable along both an optical axis direction with respect to said optical disk and also a direction perpendicular to said optical axis direction; and a second lens movable along said optical axis direction with respect to said first lens.

21. An optical disk apparatus as claimed in claim 16, further comprising:

magnetic field generating means for generating a magnetic field in correspondence with a position of a light spot of said light beam irradiated by said light beam irradiating means onto said optical disk.

22. An optical disk apparatus as claimed in claim 16 wherein:

said detecting means detects a push-pull signal from light returned from said optical disk so as to extract deviation of the wobbled groove.

* * * * *